(12) United States Patent
Bharrat et al.

(10) Patent No.: US 12,009,967 B2
(45) Date of Patent: *Jun. 11, 2024

(54) COMMUNICATIONS METHODS AND APPARATUS FOR MINIMIZING AND/OR PREVENTING MESSAGE PROCESSING FAULTS

(71) Applicant: Ribbon Communications Operating Company, Inc., Westford, MA (US)

(72) Inventors: Shaun Jaikarran Bharrat, Edison, NJ (US); Subhransu S. Nayak, Acton, MA (US); Prince Arimpur Cheerotha Philip, Bangalore (IN); Rajangam Subramanian, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/540,203

(22) Filed: Dec. 1, 2021

(65) Prior Publication Data
US 2022/0094589 A1 Mar. 24, 2022

Related U.S. Application Data

(63) Continuation of application No. 16/787,990, filed on Feb. 11, 2020, now Pat. No. 11,240,097.

(30) Foreign Application Priority Data

Dec. 12, 2019 (IN) .............................. 201941051509

(51) Int. Cl.
*H04L 41/0654* (2022.01)
*H04L 65/1104* (2022.01)

(52) U.S. Cl.
CPC ...... *H04L 41/0654* (2013.01); *H04L 65/1104* (2022.05)

(58) Field of Classification Search
CPC .......................... H04L 41/0654; H04L 65/1104
(Continued)

(56) References Cited

U.S. PATENT DOCUMENTS

2009/0007220 A1* 1/2009 Ormazabal ........... H04L 63/107
706/14
2013/0212298 A1* 8/2013 Bunch ................. H04L 65/1045
709/244

(Continued)

OTHER PUBLICATIONS

J. Hautakorpi, Ed, G. Camarillo, R. Penfield, A. Hawrylyshen, M. Bhatia, Requirements from Session Initiation Protocol (SIP) Session Border Control (SBC) Deployments, Internet Engineering Task Force, ISSN: 2070-1721, Apr. 2010 (Year: 2010).*

*Primary Examiner* — Wing F Chan
*Assistant Examiner* — John Fan
(74) *Attorney, Agent, or Firm* — Straub & Straub; Stephen T. Straub; Michael P. Straub

(57) ABSTRACT

The present invention relates to methods and apparatus for detecting, minimizing and/or preventing message processing faults and in particular message processing fault avalanches at a single processing device and among a cluster of message processing devices. An exemplary method embodiment includes: enabling message blocking at a Session Border Controller (SBC) for Session Initiation Protocol (SIP) messages including a first key value in response to a first threshold number of SIP messages including the first key value having caused a SIP message processing failure; receiving, at the SBC, a SIP message including at least one key value; determining if message blocking is enabled for one or more key values included in the SIP message; and dropping by the SBC the SIP message in response to determining that message blocking is enabled for one or more key values included in the SIP message, but otherwise processing the SIP message by the SBC.

20 Claims, 21 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2013/0272253 A1* | 10/2013 | Veenstra | H04W 72/52 |
| | | | 370/329 |
| 2016/0366189 A1* | 12/2016 | Hart | H04L 43/0811 |
| 2017/0054642 A1* | 2/2017 | Kennedy | H04L 47/2433 |
| 2020/0252503 A1* | 8/2020 | Li | H04L 65/1079 |

* cited by examiner

900

902 → Internet Protocol, Src: 192.168.0.2 (192.168.0.2), Dst: 192.168.0.60 (192.168.0.60)
Session Initiation Protocol
INVITE sip:bob@freehold.example.com SIP/2.0
Allow: INVITE, ACK, BYE, CANCEL, OPTIONS, REFER, NOTIFY, REGISTER
903 → Via: SIP/2.0/TCP 192.168.0.2:5060; branch=a9gH4bc74ce9
904 → From: Alice <sip:alice@denver.example.com>;tag=9fxced76sl
906 → To: Bob <sip:bob@freehold.example.com>
908 → Call-ID: 3246217298221188511@denver.example.com
CSeq: 2 INVITE
Contact: <sip:alice@client.denver.example.com;transport=tcp>
910 → Remote-Party-ID: Alice <sip:alice@denver.example.com>
912 → P-Asserted-Identity: Alice <sip:alice@denver.example.com>
914 → P-Source-Device: 216.3.128.12
Content-Type: application/sdp
Content-Length: 151

FIGURE 9

| | KEY TYPE | KEY VALUE | FAULT/CRASH COUNT |
|---|---|---|---|
| 1108 → | KEY TYPE | KEY VALUE | FAULT/CRASH COUNT |
| 1110 → | CALL ID | Y123 | 1 |
| 1112 → | CALL ID | Y234 | 1 |
| 1114 → | CALL ID | Y345 | 1 |
| 1116 → | CALL ID | Y456 | 1 |
| 1118 → | CALL ID | Y567 | 1 |
| 1120 → | CALLED + CALLING | BOB + ALICE | 1 |
| 1122 → | CALLED + CALLING | BOB + HENRY | 2 |
| 1124 → | CALLED + CALLING | BOB + JOHN | 1 |
| 1126 → | CALLED + CALLING | JOHN + ALICE | 1 |
| 1128 → | CALLED PARTY | BOB | 4 |
| 1130 → | CALLED PARTY | JOHN | 1 |
| 1132 → | CALLING PARTY | ALICE | 2 |
| 1134 → | CALLING PARTY | HENRY | 2 |
| 1136 → | CALLING PARTY | JOHN | 1 |
| 1138 → | PEER IP | 10.10.10.1 | 3 |
| 1140 → | PEER IP | 10.10.5.1 | 2 |

FIGURE 11

| KEY TYPE | BLOCKED VALUE |
|---|---|
| CALL ID | Y123 |
| CALL ID | Y234 |
| CALL ID | Y345 |
| CALL ID | Y456 |
| CALL ID | Y567 |
| CALLED + CALLING | BOB + HENRY |
| CALLED PARTY | BOB |

FIGURE 13

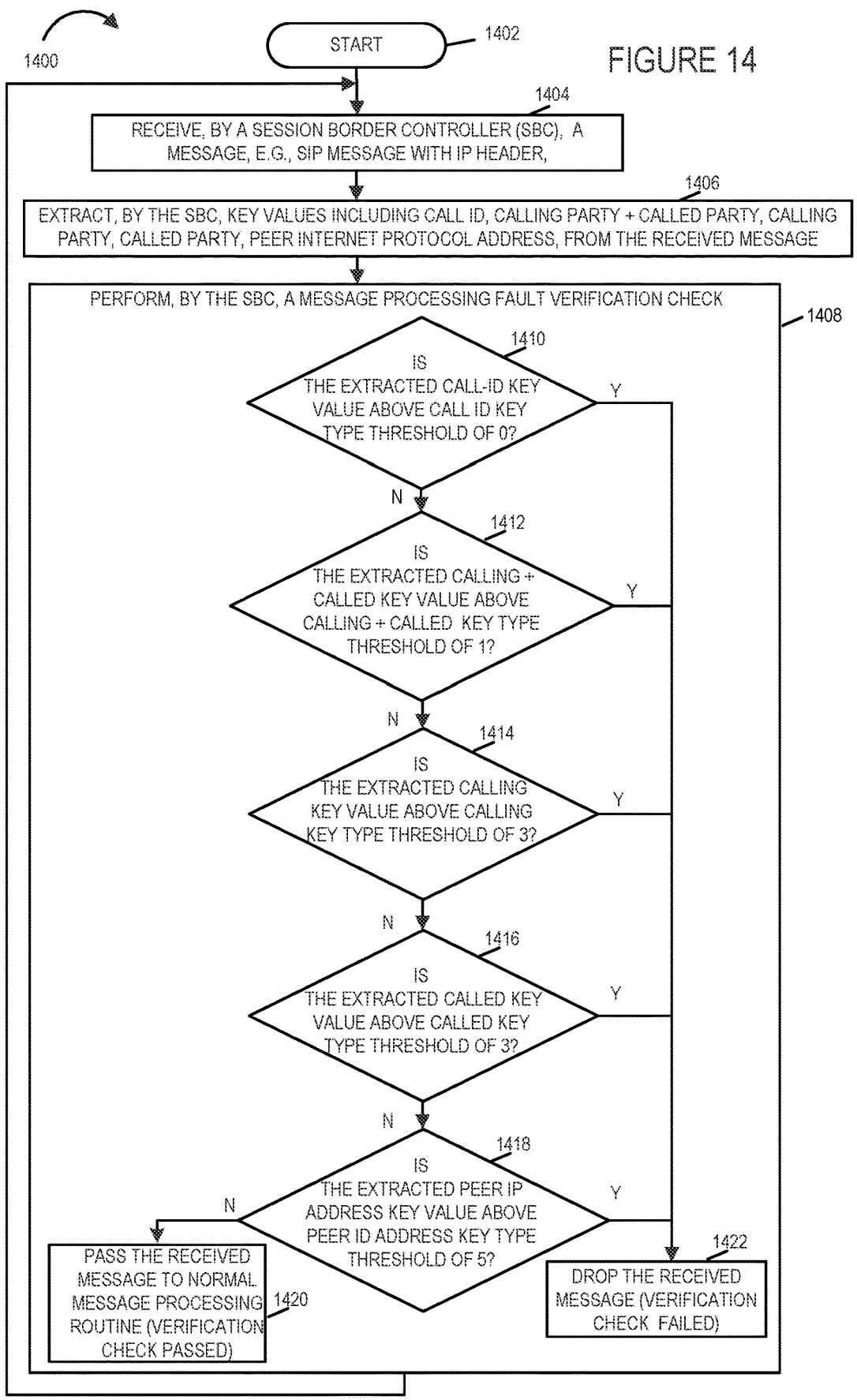

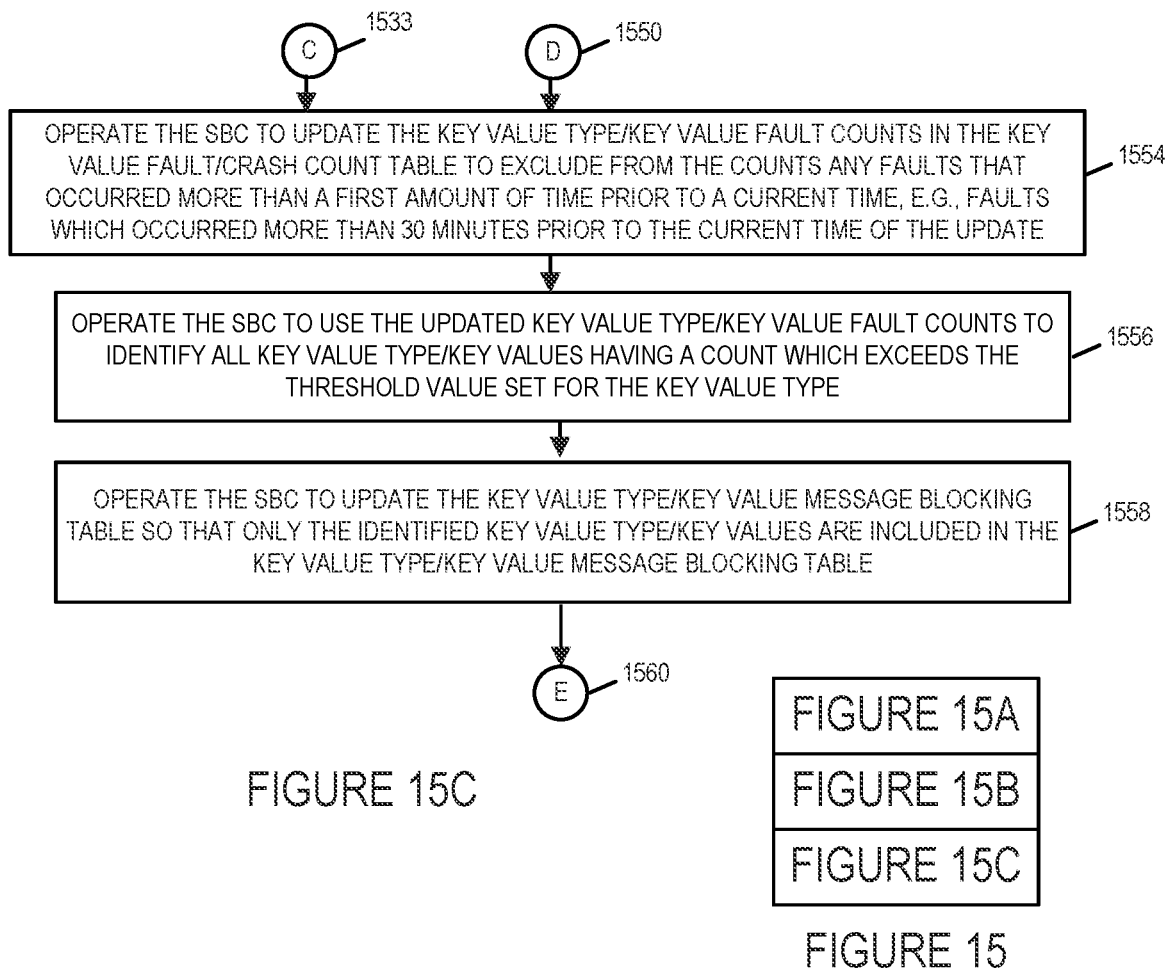

COMMUNICATIONS METHODS AND APPARATUS FOR MINIMIZING AND/OR PREVENTING MESSAGE PROCESSING FAULTS

RELATED APPLICATION

The present application is a continuation of U.S. patent application Ser. No. 16/787,990 which was filed on Feb. 11, 2020 and published as U.S. Patent Application Publication Number: US 2021-0184917 A1 on Jun. 17, 2021 which claims the benefit of Indian Provisional Patent Application Serial Number: 201941051509 which was filed on Dec. 12, 2019. All of the above mentioned patent applications and publications are hereby expressly incorporated by reference in their entirety.

FIELD OF INVENTION

The present invention relates to communications methods and apparatus for detecting, minimizing and/or preventing message processing faults such as for example message processing fault avalanches among a cluster of message processing devices in a communications system.

BACKGROUND

In telephony applications, the High Availability of the service is a very important requirement. Traditionally, High Availability (HA) of telephony services and/or telephony applications has been achieved through the use of highly available hardware and/or software schemes in a 1:1 HA pairing. With the transition to telephony applications and services provided via cloud services, this changed into multi-node services in N:1 availability groups. One of the putative advantages of the cloud model is that the individual nodes become smaller, so the failure of a single node affects a far smaller set of users, i.e., a failure results in a smaller "blast radius space" and/or "blast radius epoch", "blast radius space" being the number of instances affected by a failure or the breadth of a failure, and "blast radius epoch" or the depth of a failure being how long it takes to mitigate the failure. Unfortunately, there are certain types of failures which result in a cascade of nodes or instances failing (large "blast radius space"), or nodes getting caught in a continuous crash-reboot cycle (i.e., long "blast radius epoch").

An exemplary telephony application is a Session Border Controller (SBC) that may be implemented in a cloud environment as a virtualized SBC telephony service. Analysis has shown that an SBC cluster (i.e., a group of SBCs) of virtual SBCs instantiated as instances in a cloud system have a higher reliability expectation than a SBC HA hardware pair provided that certain preconditions are met. One of these preconditions is that faults must be uncorrelated, i.e., that the probability of a second fault must be independent of a prior fault.

There is a class of software faults which does not meet this desired precondition. For example, consider a situation where a received packet "deterministically" causes a software fault in the SBC. The deterministic qualifier is important. If such a fault happens only randomly in processing that packet, or if the timing of the fault is random, then this is less cause for concern as faults in processing more than one instance of that packet can be considered to be uncorrelated. If, instead, some process fault occurs with a high likelihood or probability within a short interval (e.g., a few seconds) of processing a particular packet, then this is a "deterministic" fault. Deterministic faults can happen for many reasons. In many or sometimes a majority of the cases observed, it is due to either a null pointer or corrupted pointer access by a software routine, module or component. For example, while the majority of such faults have been observed in a SIP stack module and a call processing module, there are also many observed occurrences across a variety of SBC routines, components and modules.

Packets which cause a deterministic SBC fault can lead to a catastrophic failure of an SBC service implemented by a cluster of SBC instances. In such a case, the SBC instance application may continue to execute and the hardware is unaffected but the SBC service of processing Session Initiation Protocol (SIP) messages or calls ceases to function properly or at all. This type of failure can lead to a "message or packet fault avalanche" failure. Such packets can appear for any number of reasons including a new SIP endpoint added to the system, a peering endpoint or Gateway being upgraded or replaced, a configuration change on a peer, or a new call scenario introduced. In the avalanche scenario, the first instance of this message or packet causes an active SBC (e.g., SBC A) handling the message or packet to crash and reboot. A standby SBC (e.g., SBC B) takes over for the crashed SBC (SBC A), so no stable calls are lost. However, suppose a second instance of the message or packet is received at another SBC (e.g., SBC C) before SBC A has rebooted and becomes a synced standby. Now, SBC C will crash but there is no standby so all calls are lost. Additional instances of the message or packet can bring down or take out the entire SBC network (e.g., a cluster of SBCs), and the entire service will be in a continuous crash and restart cycle until the offending entity which sent the offending message or packet is identified and eliminated from the network. This identification and elimination is a manual, time-consuming process which can result in an hours-long service outage.

Furthermore, the ability to predict and/or comprehensively test for message/packet processing faults that will cause catastrophic failures such as crashes and reboots is extremely difficult, time consuming and in many ways impractical and/or impossible with respect to text based protocols such as the Session Initiation Protocol wherein an unlimited number of variations of text characters can be inputted in the message.

While the problem has been described in terms of how its affects clusters of virtualized SBCs in a cloud environment, the problem is also applicable to SBCs which are not virtualized in a cloud environment but are still operated in a cluster configuration, e.g., in order to provide high availability service. Additionally, the fault avalanche problem is also applicable in a singular SBC service, where the single SBC is not part of a cluster of SBCs. In the singular SBC case, the single SBC stays in a SIP message processing crash-reboot cycle.

From the foregoing it is apparent that there is a need for a technological solution to how to effectively, efficiently and in a cost-efficient manner detect and/or minimize or reduce the blast radius space and blast radius epoch of certain failure types, e.g., deterministic failure types, in a telephony service implemented as a service cluster that solves one, some, or all of the aforementioned problems. From the foregoing is should be appreciated that there is a need for a technological solution to minimizing or reducing cascading failures and preventing continuous crash-restart cycles due to deterministic message or packet processing failures. There is also a need to detect and/or minimize or reduce message processing faults that result in device crashes or reboots in text based communications protocols such as for example Session Initiation Protocol (SIP) and Hyper Text Transfer Protocol (HTTP) where testing the protocol for all possible variations in advance to prevent message processing faults and system crashes and reboots is extremely difficult, time consuming and in many ways impractical.

SUMMARY

The present invention relates to communications methods and apparatus for detecting and/or minimizing or reducing the breadth of the number of communications nodes affected by a deterministic failure, e.g., a deterministic message or packet processing failure and minimizing or reducing how long the failure persists before it is mitigated. Various embodiments of the present invention address and solve one or more of the technological problems discussed above.

Various methods and apparatus are described which allow for tracking of key value fault counts for key values included in messages and/or packets the processing of which have caused or resulted in the message processing failures such as message processing device crashes and reboots and the use of key value based message blocking for messages including key values above a fault count threshold number. The various methods and apparatus when implemented in a cluster of message/packet processing devices such as Session Border Controllers processing SIP messages can reduce or minimize the affect of message/packet processing failures including reducing and/or preventing cascading faults and avalanche message/packet processing faults.

An exemplary method embodiment of the present invention includes the steps of: enabling message blocking at a first Session Border Controller (SBC) for Session Initiation Protocol (SIP) messages including a first key value in response to a first threshold number of SIP messages including the first key value having caused a SIP message processing failure (e.g. at an SBC where the SIP processing failure may be at any one of a plurality of SBCs in a cluster of SBCs which includes said first SBC); receiving, at the first Session Border Controller, a first Session Initiation Protocol (SIP) message including at least one key value; determining, at the first SBC, if message blocking is enabled for one or more key values included in the first SIP message; and performing, at the first SBC, one of: i) dropping the first SIP message in response to determining that message blocking is enabled for one or more key values included in the first SIP message; and ii) processing the first SIP message in response to determining that message blocking is not enabled for a key value included in the first SIP message.

In some method embodiments, the key values included in the first SIP message include at least one of a call-id value, a calling party value (e.g., calling party identifier such as a telephone number, name or address), a called party value (e.g., called party identifier such as a telephone number, name or address), a called party value and a calling party value, and a peer device Internet Protocol address value. In some embodiments, the first SIP message is a SIP INVITE request message for a Voice Over Internet Protocol (VOIP) call.

In some embodiments, the method further includes the steps of: receiving, at the first SBC, from a second SBC, a message indicating key values in a second SIP message that caused a SIP message processing failure at the second SBC; and updating a count of key values stored at the first SBC for each of the indicated key values in the second SIP message.

In some, but not all embodiments, the method further includes the step of storing in the first SBC, a SIP message blocking threshold number for each of a plurality of different key values.

In some embodiments, the method further includes the steps of: setting a first threshold value for a first key value type and setting a second threshold value for a second key value type. The step of storing in the first SBC, a SIP message blocking threshold number for each of a plurality of different key values in some embodiments includes storing the first threshold value as the SIP message blocking threshold number for each key value being of the first key value type and storing said second threshold value for each key value being of the second key value type.

In some embodiments the method includes the step of setting a lower SIP message blocking threshold value for a first key value type than a second key value type. Each key value in some such embodiments corresponds to a key value type and the first key value type blocks fewer SIP messages than said second key value type. In some such embodiments, the first key value type is a call-id key value type and the second key value type is a calling party key value type.

Various embodiments include the additional steps of: operating the second SBC to receive the second SIP message;
identifying or extracting key values in the second SIP message; detecting at the second SBC a SIP message processing failure caused by the processing of said second SIP message (e.g., a catastrophic SIP message processing failure); and communicating to other SBCs key values included in said second SIP message along with an indication that the communicated key values were associated with or correspond to a SIP message processing failure.

The invention is also directed to systems and apparatus that are used to implement the various method embodiments of the invention. In some apparatus embodiments the node or device, e.g., SBC, Gateway, SIP processing device, executing the message processing fault detection and reduction steps and each of the other apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system. In some embodiments, the SBC or SIP processing devices are virtual devices implemented on compute nodes in a cloud system where in the compute node includes a processor and memory or is attached to a memory.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 9 illustrates an exemplary message in accordance with an embodiment of the present invention

FIG. 11 illustrates a fault count or crash table for the five faults whose information is provided in table illustrated in FIG. 10.

FIG. 13 illustrates a key value blocking table in accordance with an embodiment of the present invention.

FIG. 14 illustrates an exemplary method in accordance with an embodiment of the present invention.

FIG. 15 comprises FIGS. 15A, 15B, and 15C.

FIG. 15C illustrates the third part of a flowchart of an exemplary communications method in accordance with an embodiment of the present invention.

FIG. 16 comprises FIGS. 16A, 16B, and 16C.

DETAILED DESCRIPTION

Figure 1:
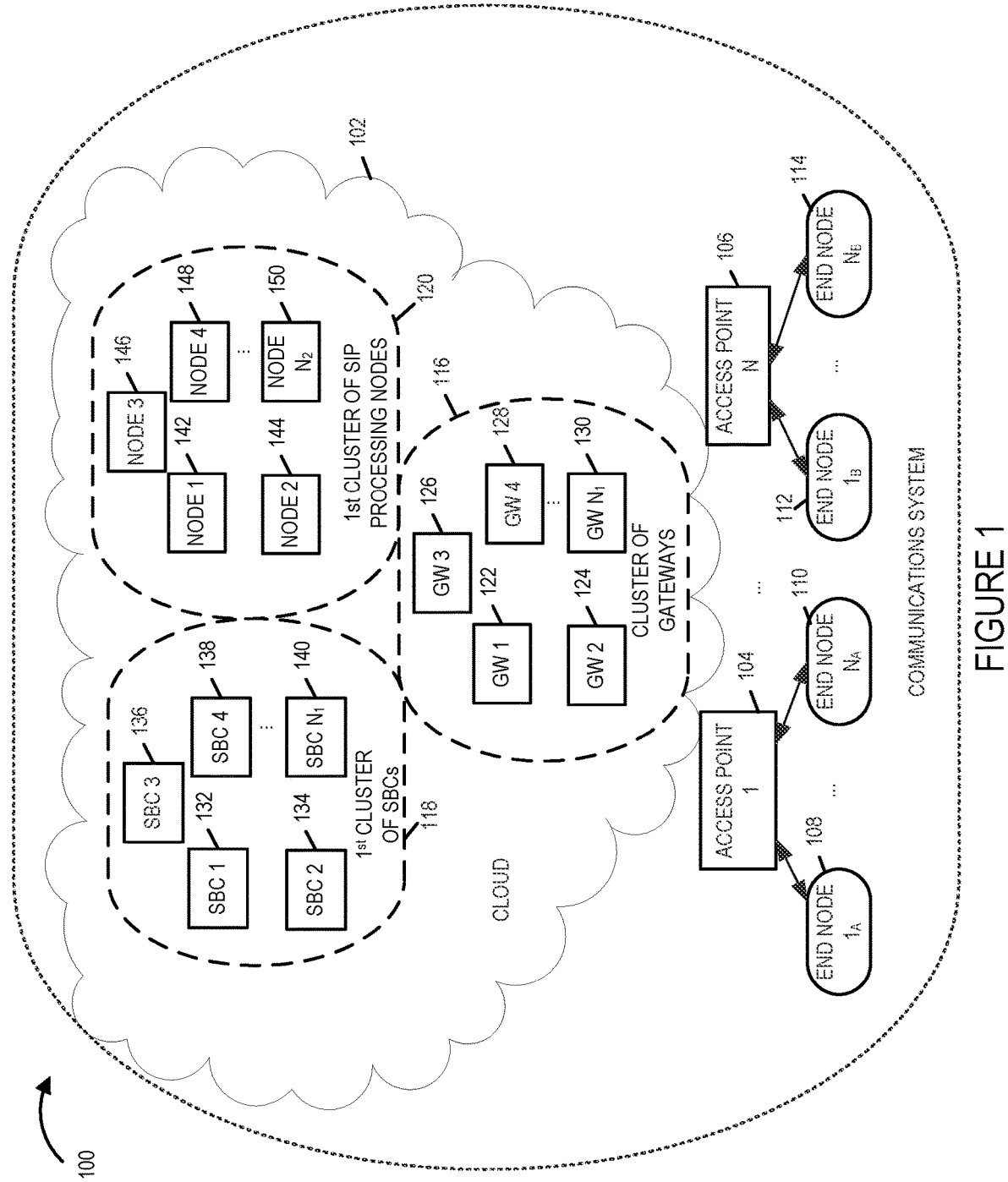
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a cloud 102, and a plurality of access points (access point 1 104, . . . , access point N 106). Cloud 102 includes a cluster 116 of gateways (GW 1 122, GW 2 124, GW 3 126, GW 4 128, . . . , GW $N_1$ 130, a cluster 118 of session border controllers (SBC 1 132, SBC 2 134, SBC 3 136, SBC 4 138, . . . , SBC $N_2$ 140), and a cluster 120 of SIP processing nodes or devices (Node 1 142, Node 2 144, Node 3 146, Node 4 148, . . . , Node $N_3$ 150). The various devices (access points, SBCs, SIP processing nodes, and gateways) may be coupled together via wired, optical, and/or wireless communications links. Exemplary communications system 100 further includes a plurality of end nodes ((end node $1_A$ 108, . . . , end node $N_A$ 110, end node $1_B$ 112, . . . end node $N_B$ 114)). The end nodes, e.g., user devices, include mobile communications devices and stationary communications devices. An end node, e.g., end node 108, may communicate with an access point via a wired, optical and/or wireless communications link.

A cluster of telecom nodes, e.g., cluster 118 of SBCs, cluster 116 of gateways, or cluster 120 of SIP processing nodes or devices, implements a packet fault detection and failure prevention and/or mitigation method in accordance with the present invention. In the exemplary embodiment, the packets are Session Initiation Protocol packets.

Figure 2:
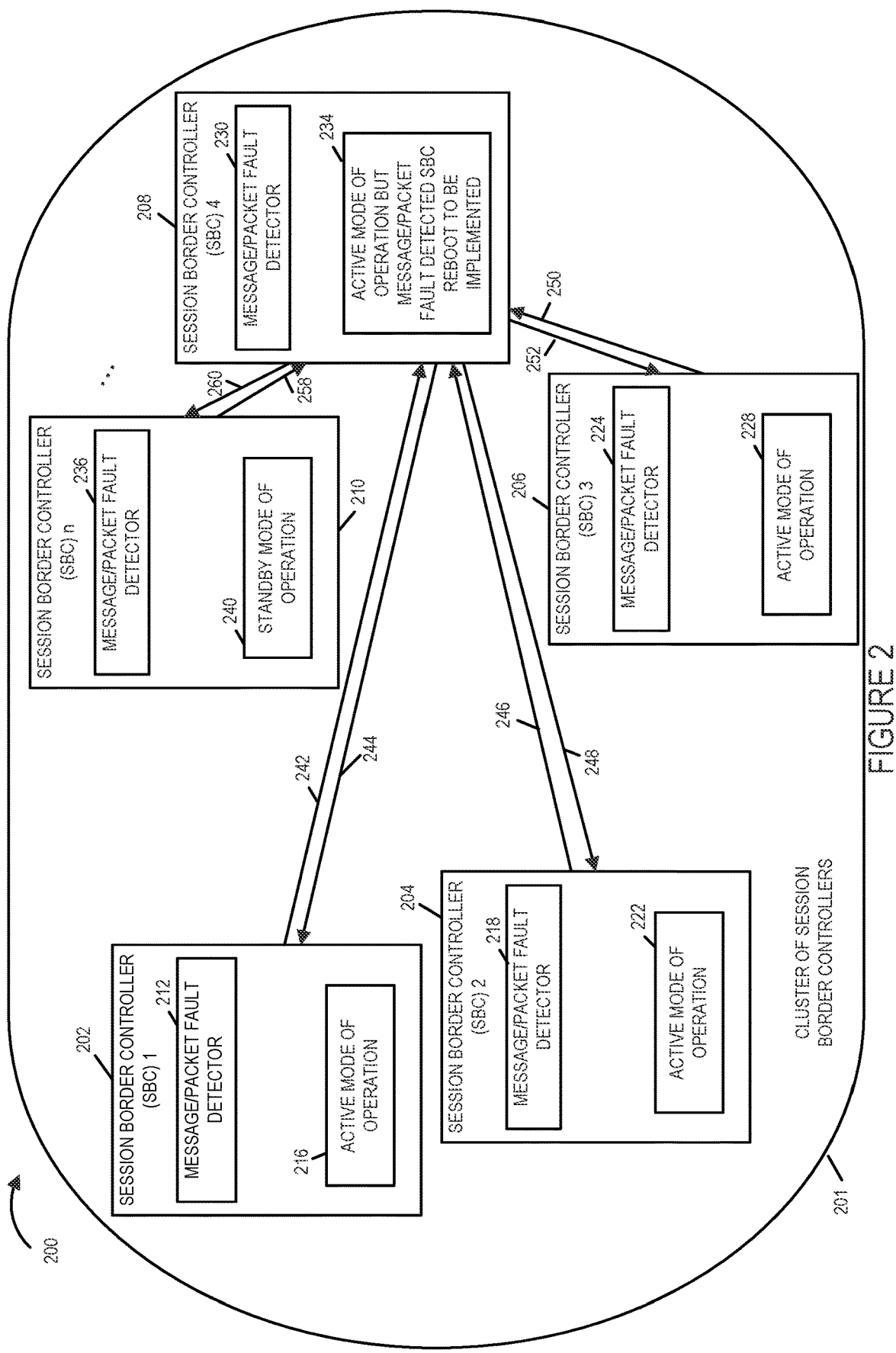
FIG. 2 is a drawing illustrating an exemplary cluster of session border controllers (SBCs) in accordance with an exemplary embodiment.

FIG. 2 is a drawing 200 illustrating an exemplary cluster 201 of session border controllers (SBCs) in accordance with an exemplary embodiment. Exemplary cluster 201 is, e.g., exemplary cluster 118 of FIG. 1. The exemplary cluster 201 of session border controllers includes a plurality of session border controllers (SBC 1 202, SBC 2 204, SBC 3 206, SBC 4 208, . . . , SBC n 210). Exemplary cluster 201 is, e.g., exemplary cluster 118 of FIG. 1, with SBCs (202, 204, 206, 208, . . . , 210) being the same as SBCs (132, 134, 136, 138, . . . , 140), respectively of FIG. 1. Each session border controller (SBC 1 202, SBC 2 204, SBC 3 206, SBC 4 208, . . . , SBC n 210) includes a packet fault detector/message fault detector (212, 218, 224, 230, . . . , 236 respectively) which detects message faults and/or packet faults. Each message/packet fault detector 212, 218, 224, 230, . . . , 236 upon detection of a packet and/or message fault which results in a catastrophic failure will communicate or cause the SBC to communicate the packet or message which caused the catastrophic failure and/or key information about the packet or message which caused the catastrophic failure to the other SBCs (SBC 202, SBC 204, SBC 206, SBC 208, . . . , SBC 210) in the cluster of SBCs 201. A catastrophic failure is for example a software failure in which the SBC crashes or ceases to provide services such as the processing of packets and/or a failure which causes the SBC to reboot or restart. During a catastrophic failure the SBC continues to operate with limited functionality until a reboot, reset or restart of the SBC is achieved. The limited functionality includes, among other things, the ability to identify the packet or message which was being processed that caused the failure or that was being processed at the time of the failure, identify and store in persistent memory the time of the failure, key values or information about the packet or message which caused the failure, and also to communicate with other SBCs including sending and or exchanging one or more messages which include the packet or message which caused the failure and/or key values or information about the packet or message including the time of the failure which caused the failure or was being processed at the time of the failure.

Each SBC (SBC 1 202, SBC 2 204, SBC 3 206, SBC 4 208, . . . , SBC n 210) has a mode of operation module or component which places the SBC in an active or standby mode of operation. In the cluster of SBCs 201, the SBC 202, 204, 206, 208 and 236 the mode of operation module or component is 216, 222, 228, 234 and 240 respectively. In an active mode of operation of the SBC processes packets or messages, e.g., SIP packets or SIP messages, while in standby mode the SBC is does not process packets or messages but is in an idle state until it detects the failure of one of the other SBCs in the cluster of SBCs 201. The SBC in the standby mode of operation provides for a high availability SBC service by taking over for a SBC in the cluster which fails. In the exemplary cluster of SBCs 201 the SBCs 202, 204, and 206 are in an active mode of operation in which they are processing messages or packets, the SBC n 210 is in a standby mode of operation and the SBC 4 208 is in active mode of operation but has detected a packet fault, e.g., service failure which will cause an SBC reboot to be implemented. When the SBC 234 is rebooted, the SBC n 210 will change its mode of operation from standby to active and will take over the operations and responsibilities of the SBC 208 which will become inactive while it is rebooted. In some embodiments, SBC 210 assumes the IP address, message and packet processing operations of the SBC 208 which is rebooted and upon the completion of the reboot the SBC 208 enters standby mode. In example of the cluster of SBCs 201 there is N−1:1 availability as there are N−1 active SBCs and 1 standby SBC which will take over when one of the active SBCs fails.

Messages 244, 248, 252, . . . , 260 are communicated from SBC 208 to SBC 202, 204, 206, . . . , 210 respectively. The messages 244, 248, 252, . . . , 260 include the packet or message or key information about the packet or message which was detected by the packet fault detector 230 in SBC 208 and which will result in the SBC 208 be rebooted or restarted, e.g., because the SBC software fault detected has caused the SBC to stop processing packets or messages, e.g., SIP packets or messages. The messages 244, 248, 250, . . . , 258 from SBC 202, SBC 204, SBC 206, . . . , SBC 210 to SBC 208 are optional acknowledge messages notifying SBC 208 that the messages 242, 246, 250, . . . , 260 were received by SBC 202, SBC 204, SBC 206, . . . , SBC 210 respectively. The message/packet fault detector in some embodiments detects packet faults as well as message faults. In some embodiments, the packets are SIP packets.

Exemplary computing device/node 300 includes an optional display 302, an input device 304, a processor 306, e.g., a CPU, I/O interfaces 308 and 309, which couple the computing device/node 300 to networks or communications links and/or various other nodes/devices, memory 310, and an assembly of hardware components 319, e.g., circuits corresponding to different components and/or modules, coupled together via a bus 325 over which the various elements may interchange data and information. Memory 310 includes an assembly of components 318, e.g., an assembly of software components, and data/information 320. The assembly of software components 318 includes a control routines component 322 which includes software instructions which when processed and executed by processor 306 control the operation of the computing device/node 300 to perform various functions and/or one or more steps of the various method embodiments of the invention. The I/O interface 308 includes transmitters 330 and receivers 332. The I/O interface 309 includes transmitters 334 and receivers 336. The I/O interfaces are hardware interfaces including hardware circuitry. The computing device/node 300 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP), Representative State Transfer (REST) protocol, SQL (Structured Query Language) Protocol, and HDFS (Hadoop Distributed File System) Protocol, SQL and/or HDFS being used to interface and access information from various databases and/or storage devices to which it may be coupled. In some embodiments, the computing device/node 300 includes a communication component configured to operate using SIP, SDP, IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 300 can include more than one processor with the processing being distributed among the plurality of processors. In some embodiments, one or more of the following are implemented in accordance with the computing device/node 300 illustrated in FIG. 3: session border controllers (SBC), SIP processing nodes or devices and gateways illustrated in FIGS. 1, 2, and 17.

Figure 6:
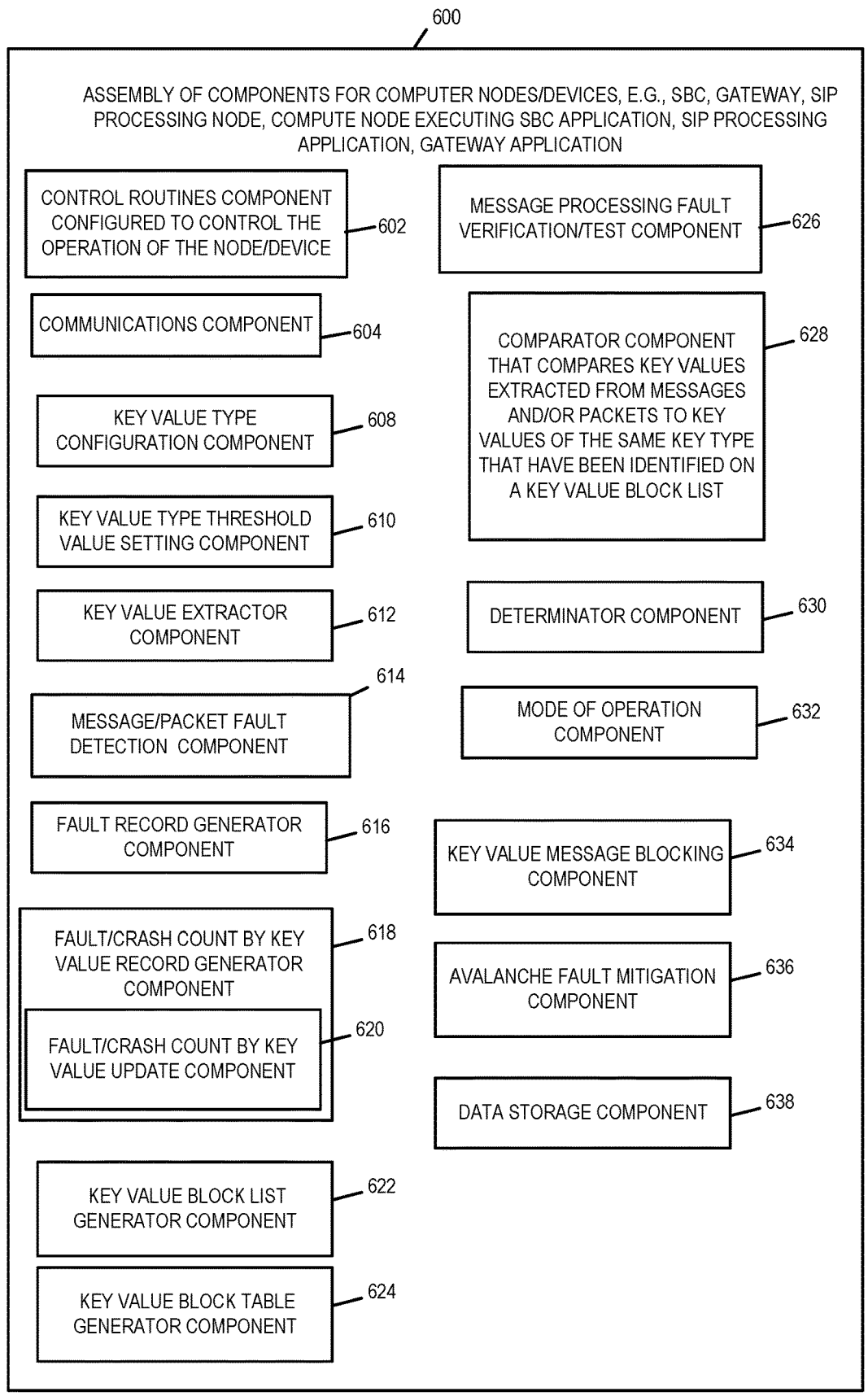
FIG. 6 illustrates an assembly of components for use in an exemplary computing device/node in accordance with an embodiment of the present invention.

An exemplary assembly of components 600 for a computing node 300 implemented as a node or device, e.g., a node executing an application for SIP packet fault detection and mitigation in accordance with an embodiment of the present invention is illustrated in FIG. 6. In some embodiments, the assembly of components 600 for a computing node 300 implemented as a Session Border Controller, a SIP processing node or device or a Gateway node or device that includes packet fault detection and/or mitigation and/or minimization or prevention of packet fault failures. One or more of the assembly of components 600 may be implemented as hardware components in the assembly of hardware components 319 or as software components in the assembly of software components 318 stored in memory 310 of the exemplary computing node/device 300. The assembly of components 600 will be discussed in further detail below.

Figure 4:
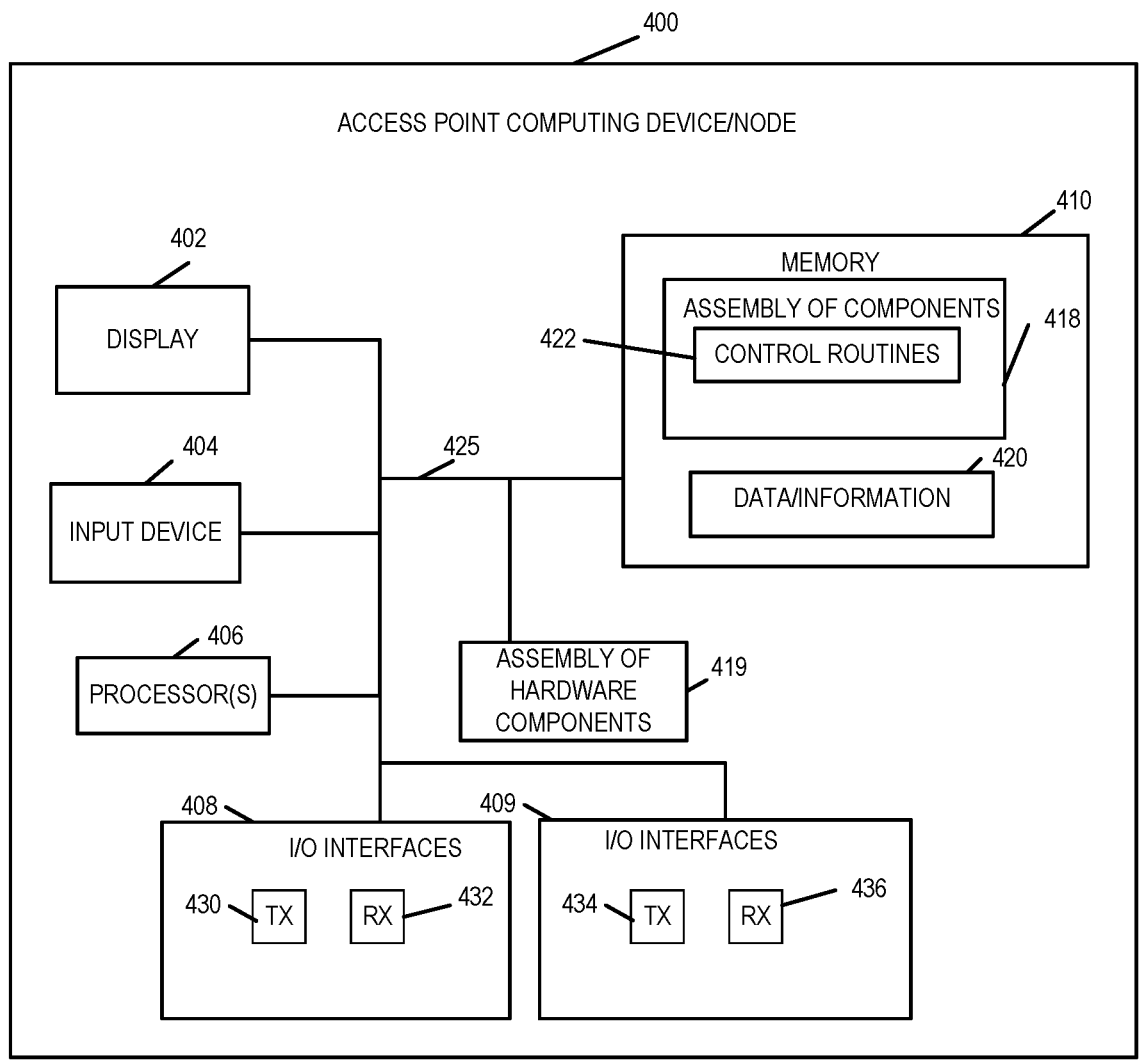
FIG. 4 illustrates an exemplary access point computing device/node in accordance with an embodiment of the present invention.

Exemplary Access Point computing device/node 400 is for example an Internet Protocol Private Branch Exchange telecommunications system, a mobile base station, a network address port translator or other communications device/node that couples an end node to a communications network providing the end node or device with access to the communications network. The exemplary access point computing device/node 400 includes an optional display 402, an input device 404, a processor 406, e.g., a CPU, I/O interfaces 408 and 409, which couple the access point computing device/node 400 to networks or communications links and/ or various other nodes/devices, memory 410, and an assembly of hardware components 419, e.g., circuits corresponding to different components and/or modules, coupled together via a bus 425 over which the various elements may interchange data and information. Memory 410 includes an assembly of components 418, e.g., an assembly of software components, and data/information 420. The assembly of software components 418 includes a control routines component 422 which includes software instructions which when processed and executed by processor 406 control the operation of the access point device/node 400 to perform various functions and/or one or more steps of the various method embodiments of the invention. The I/O interface 408 includes transmitters 430 and receivers 432. The I/O interface 409 includes transmitters 434 and receivers 436. The I/O interfaces are hardware interfaces including hardware circuitry. The access point device/node 400 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP). In some embodiments, the access point device/node 400 includes a communication component configured to operate using SIP, SDP, IP, TCP, UDP. In some embodiments, the communications component is a hardware component, a software component or a component including hardware and software components. While only a single hardware processor is illustrated in some embodiments, it is to be understood that the access point computing device/node 400 can include more than one processor with the processing being distributed among the plurality of processors. In some embodiments, one or more of the following are implemented in accordance with access point computing device/node 400 illustrated in FIG. 4: Access Point 1 104, . . . Access Point N 106 illustrated in FIG. 1.

Figure 7:
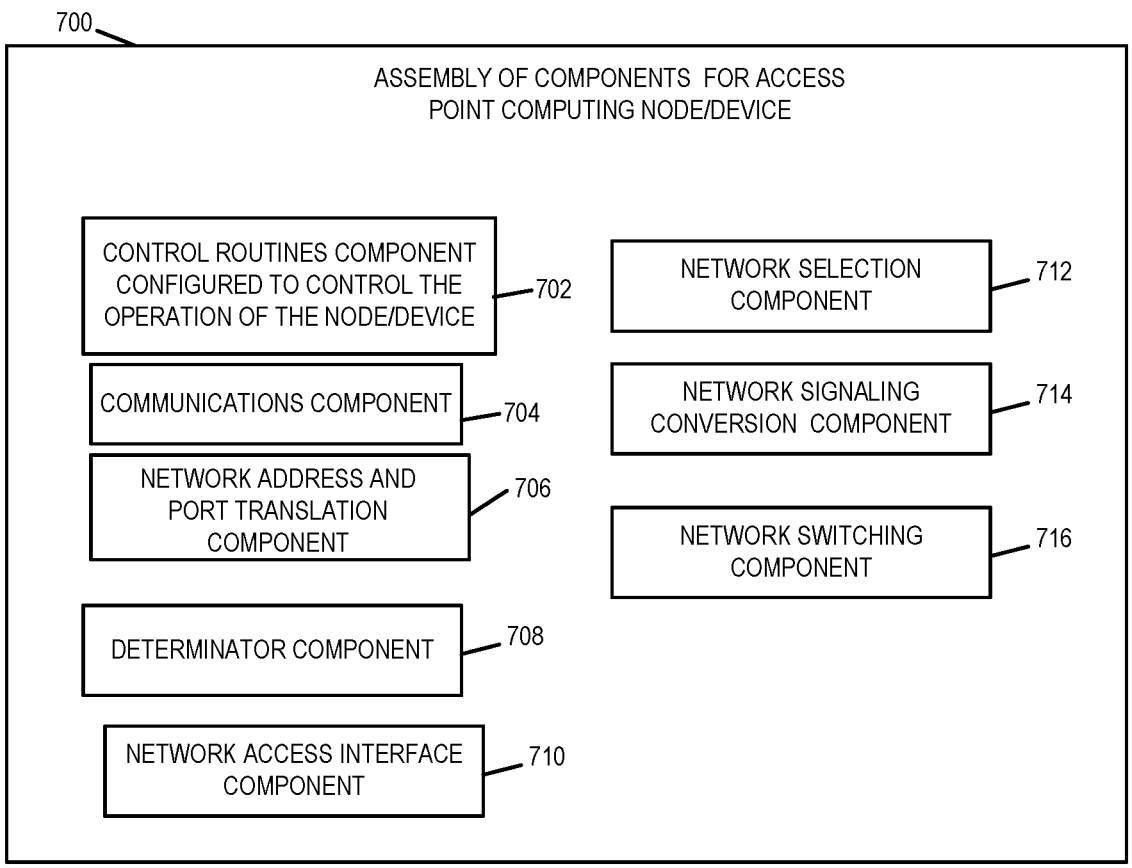
FIG. 7 illustrates an assembly of components for use in an exemplary access point computing device/node in accordance with an embodiment of the present invention.

An exemplary assembly of components 700 for access point computing node/device 400 implemented as a node or device, e.g., a node providing access to a communications network in accordance with an embodiment of the present invention is illustrated in FIG. 7. In some embodiments, the assembly of components 700 for access point computing node/device 400 is implemented as a mobile base station when the end nodes are wireless devices. One or more of the assembly of components 700 may be implemented as hardware components in the assembly of hardware components 419 or as software components in the assembly of software components 418 stored in memory 410 of the exemplary access point computing node/device 400. The assembly of components 700 will be discussed in further detail below.

Figure 5:
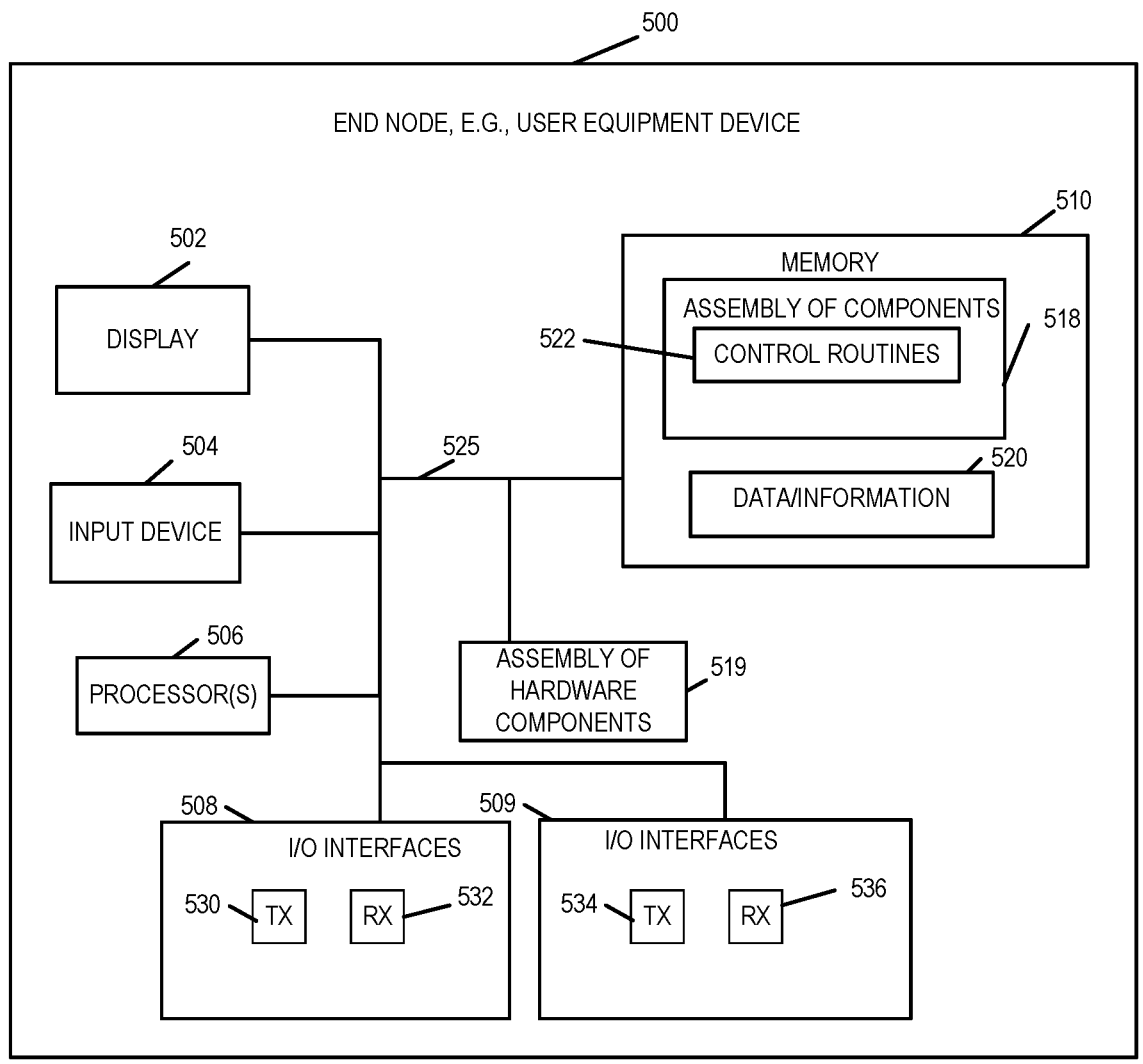
FIG. 5 illustrates an exemplary end node, e.g., user equipment device in accordance with an embodiment of the present invention.

Exemplary end node 500, e.g., a user device such as a computer, mobile device, smartphone, tablet, Internet Protocol phone, laptop, etc. includes an optional display 502, an input device 504, a processor 306, e.g., a CPU, I/O interfaces 508 and 509, which couple the end node 500 to networks or communications links and/or various other nodes/devices, memory 510, and an assembly of hardware components 519, e.g., circuits corresponding to different components and/or modules, coupled together via a bus 525 over which the various elements may interchange data and information. Memory 510 includes an assembly of components 518, e.g., an assembly of software components, and data/information 520. The assembly of software components 518 includes a control routines component 522 which includes software instructions which when processed and executed by processor 506 control the operation of the computing device/node 300 to perform various functions and/or one or more steps of the various method embodiments of the invention. The I/O interface 508 includes transmitters 530 and receivers 532. The I/O interface 509 includes transmitters 534 and receivers 536. The I/O interfaces are hardware interfaces including hardware circuitry. The computing device/node 500 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP). In some embodiments, the computing device/node 500 includes a communication component configured to operate using SIP, SDP, IP, TCP, UDP. In some embodiments, the communications component is a hardware component, a software component or a component including hardware and software components. While only a single hardware processor is illustrated in some embodiments, it is to be understood that the computing device/node 500 can include more than one processor with the processing being distributed among the plurality of processors. In some embodiments, one or more of the following are implemented in accordance with end node 500 illustrated in FIG. 5: End Node 1A 108, . . . , End Node NA 110 and End Node 1B 112, . . . , End Node NB 114 illustrated in FIG. 1 and SIP EndPoint 1716 and SIP Endpoint 2 1718 illustrated in FIG. 17.

Figure 8:
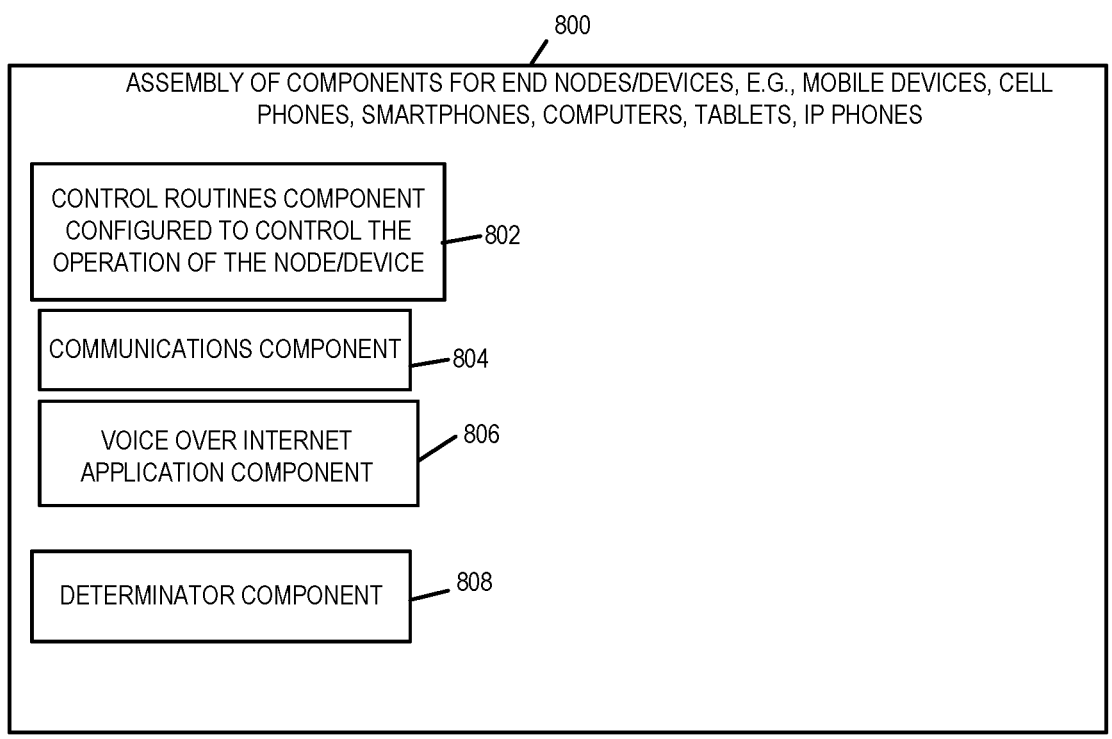
FIG. 8 illustrates an assembly of components for use in an exemplary end node/device in accordance with an embodiment of the present invention.

An exemplary assembly of components 800 for a end node 500 implemented as a node or device, e.g., a node executing a SIP application, e.g., a Voice Over Internet Protocol application, in accordance with an embodiment of the present invention is illustrated in FIG. 8. In some embodiments, the assembly of components 800 for a end node 500 is implemented as a mobile device such as for example a smartphone. One or more of the assembly of components 800 may be implemented as hardware components in the assembly of hardware components 519 or as software components in the assembly of software components 518 stored in memory 510 of the exemplary end node/device 500. The assembly of components 800 will be discussed in further detail below.

In an exemplary embodiment of the present invention, some number of initial packet or message catastrophic faults are allowed to occur among the SBCs of the cluster of SBCs, e.g., SBC cluster 201, so that the information learned or obtained from those faults can be used to minimize or prevent future faults. After the SBC packet failure detector detects a packet fault or a message fault, the SBC records information about the packet or message that caused the fault locally and also propagates, i.e., communicates, the information to the other SBCs in the cluster. The information is recorded in persistent memory so that the information is not lost upon a reboot or reset of the SBC which experienced the fault. Subsequently, this SBC after reboot or reset and all other SBCs in the cluster can check packets or messages received against this information to determine whether there is a match. If there is a match, then the SBC can decide to discard the received packet or message thereby avoiding another fault, e.g., a crash of the SBC. In implementing this exemplary embodiment, numerous practical issues and details are addressed as discussed below. In the below discussion, the fault is created by a Session Initiation Protocol packet.

One detail to be addressed is what information about the packet or message needs to be captured and keyed. There are many possibilities and different situations lead to the use of different targets, i.e., information to be captured and/or keyed. Consider the case where the fault is caused only by the specific call instance. In this situation, keying on the SIP Call ID would be sufficient. If all packets with the same Call ID can be eliminated, then no further crashes will be possible. At the next level of difficulty is the case where the fault is caused by the particular call, i.e., calling party A is attempting to reach called party B. In this case, keying on Call ID by itself won't be sufficient. The retransmissions of the initial call attempt will be prevented, but then the call will likely be rerouted as a different call attempt. For this situation, one needs to key off the calling party and called party combination. Now consider the situation where it is a particular peer device causing the problem. This problem will persist across all calls and the situation will only be resolved when that peer causing the fault condition is removed.

In still another scenario, the fault may be caused by a particular call flow that produces packets that cause crashes. Blocking by Call ID or calling/called party combination doesn't work to eliminate or prevent such faults.

Another concern that needs to be addressed is the potential for false positives. This becomes particularly important when the key type can cover a large group of calls. Consider for example when the key is a peer device IP address. If this is incorrectly used to block all calls from that peer device, an unacceptably large set of calls in the network can be senselessly blocked. The threshold for blacklisting or blocking a peer device should be significantly higher than blacklisting or blocking a specific call instance or even a particular calling/called party combination. A practical system should be biased towards using the smallest potential effect mitigation to treat the problem.

An overview of an exemplary embodiment will now be discussed in connection with SIP packets or SIP messages which cause the fault. Each SBC in a cluster of SBCs monitors all the SIP messages and/or SIP packets received and processed by the SBC. Upon detection and/or identification by the SBC, e.g., by the SBC's packet fault detector, of any SIP message or SIP packet that has caused a fault, e.g., a crash of the SBC, the SBC extracts from the SIP message or SIP packet key information and stores the extracted key information about the SIP message or SIP packet that caused the fault in the SBC's memory or memory accessible to the SBC, e.g., persistent memory of the SBC so that it is maintained after a reboot of the SBC. The SBC which detected or identified the SIP message or SIP packet which caused the fault broadcasts or transmits the extracted key information about the SIP message or SIP packet that caused the fault to the other SBCs of the cluster of SBCs. The SBCs in the cluster of SBCs check incoming SIP messages and/or SIP packets for key information or values against likely problematic key information or values and drop or discard incoming SIP messages and/or SIP packets if the likelihood of a problem is higher than a threshold assigned for the key information or value.

The SBCs of the cluster of SBCs individually track problematic values or information or potentially problematic values, e.g., information, of key types in SIP messages and/or SIP packets. This involves extracting by the SBC and storing in memory of the SBC or accessible to the SBC, e.g., persistent memory, key values, e.g., information from fields of SIP messages or SIP packets, that likely caused a fault, e.g., a crash or reboot or reset of the SBC, and/or were being processed at the time a fault occurred. As well as storing in memory of the SBC or accessible to the SBC, key information or values is received from other SBCs about values or information of key types in SIP messages and/or SIP packets which caused a fault, e.g., a crash or reboot or rest at the other SBC. Exemplary key values or information include: (1) Calling Party Address (which may be and sometimes is extracted from the From header or P-Asserted-Identity (PAI) header), (2) Called Party Address, (3) Call-ID; and (4) Source Internet Protocol (IP) address of the packet or message. The From header in a SIP request message, such as for example a SIP INVITE message, indicates the initiator of the request. SIP Request messages sent by the caller to the called party use the caller's address in the From header field. The Call-ID header field in a SIP message uniquely identifies a particular call. The SIP message Remote Party ID header includes the calling party telephone number and source IP address. The SIP message P-Asserted-Identity header field includes the identity of the user sending a SIP message as it was verified by authentication. The SIP message To header field contains the information about the called party or the recipient of the SIP message. The SIP message Via header includes the IP address of the source device that sent the request. The Source and Destination Internet Protocol (IP) address of a packet may also be obtained from the IP header information of the message which for purposes of this invention are considered to be part of the SIP message or packet. Diagram 900 of FIG. 9 illustrates an exemplary SIP message including IP source and destination address 902, Via header 903, From header 904, To header 906, Call-ID header 908, Remote-Party-ID header 910, P-Asserted-Identity header 912, and P-Source-Device header 914. The Via header 903 includes the IP address of the source or an FQDN from which the IP address is derived.

On every catastrophic fault, e.g., crash, a fault record containing the values of each of the above key types from the SIP message or SIP packet that caused the crash is created. This fault record will be both stored locally in the SBC or in memory accessible to the SBC and communicated (directly or indirectly) to the other SBCs or SBC instances in the cluster of SBCs.

Figure 10:
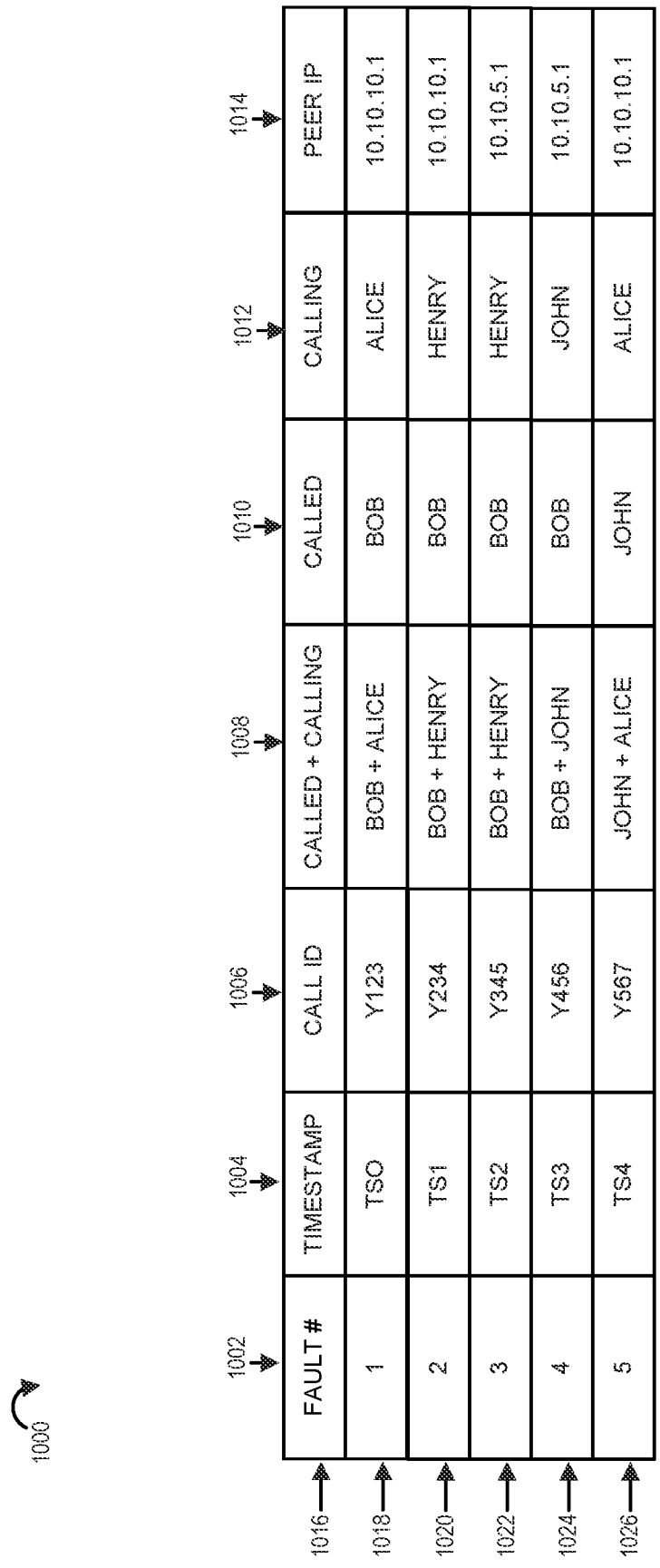
FIG. 10 illustrates a table including message fault records including the details of the offending packets or messages which resulted in five packet or message processing faults, e.g., catastrophic faults or crashes.

Every SBC of the cluster maintains a table or record of fault counts also referred to as crash counts by key type and key value using the data/information from the fault records. For example, in a situation where the SBC cluster has seen five packet or message induced crashes in the recent past, with the communication of the fault records and/or key type and key value fault information every SBC in the cluster will eventually have the same set of fault records. Table 1000 of FIG. 10 illustrates the details of the offending packets or messages which resulted in the five catastrophic faults or crashes. Table 1000 includes rows 1016, 1018, 1020, 1022, 1024, and 1026. Row 1016 does not include information regarding the faults but has been included for explanatory purposes as it provides headings or labels identifying the information contained in each of the columns 1002, 1004, 1006, 1008, 1010, 1012 and 1014 of the table. Column 1002 includes the fault number as indicated by the column heading Fault # (column 1002, row 1016). Each of the rows 1018, 1020, 1022, 1024, and 1026 of the table 1000 includes information corresponding to the fault number of the row as identified in column 1002. Row 1018 includes information corresponding to the first fault. Row 1020 includes information corresponding to the second fault. Row 1022 includes information corresponding to the third fault. Row 1024 includes information corresponding to the fourth fault. Row 1026 includes information corresponding to the fifth fault. Column 1004 includes a timestamp of receipt of the message which caused the fault as identified by the Timestamp heading (column 1004, row 1016). In some embodiments, the timestamp value is the time at which the fault occurred. Column 1006 includes the Call ID to which the message that caused the fault corresponds as identified by the heading Call ID (column 1006, row 1016). Column 1008 includes information on the combination of the called party and calling party corresponding to the message that caused the fault as indicated by the heading Called+Calling (column 1008, row 1016). Column 1010 includes information on the called party corresponding to the message that caused the fault as indicated by the heading Called (column 1010, row 1016). Column 1012 includes information on the calling party corresponding to the message that caused the fault as indicated by the heading Calling (column 1012, row 1016). Column 1014 includes information on the Peer Device IP address from which the message that caused the fault was received as indicated by the Peer IP heading (column 1014, row 1016).

The table 1000 row 1018 stores the information extracted from or about the message causing or being processed at the time of the first fault including the received time stamp of the message TS0 ((column 1004, row 1018), the CALL-ID Y123 (column 1006, row 1018), the called and calling party address Bob+Alice (column 1008, row 1018), called party address Bob (column 1010, row 1018), the calling party address Alice (column 1012, row 1018) and the Peer IP address 10.10.10.1 (column 1014, row 1018).

The table 1000 row 1020 stores the information extracted from or about the message causing or being processed at the time of the second fault including the received time stamp of the message TS1 ((column 1004, row 1020), the CALL-ID Y234 (column 1006, row 1020), the called and calling party address Bob+Henry (column 1008, row 1020), called party address Bob (column 1010, row 1020), the calling party address Henry (column 1012, row 1020) and the Peer IP address 10.10.10.1 (column 1014, row 1020).

The table 1000 row 1022 stores the information extracted from or about the message causing or being processed at the time of the third fault including the received time stamp of the message TS2 ((column 1004, row 1022), the CALL-ID Y345 (column 1006, row 1022), the called and calling party address Bob+Henry (column 1008, row 1022), called party address Bob (column 1010, row 1022), the calling party address Henry (column 1012, row 1022) and the Peer IP address 10.10.5.1 (column 1014, row 1022).

The table 1000 row 1024 stores the information extracted from or about the message causing or being processed at the time of the fourth fault including the received time stamp of the message TS3 ((column 1004, row 1024), the CALL-ID Y456 (column 1006, row 1024), the called and calling party address Bob+John (column 1008, row 1024), called party address Bob (column 1010, row 1024), the calling party address John (column 1012, row 1024) and the Peer IP address 10.10.5.1 (column 1014, row 1024).

The table 1000 row 1026 stores the information extracted from or about the message causing or being processed at the time of the fifth fault including the received time stamp of the message TS4 ((column 1004, row 1026), the CALL-ID Y567 (column 1006, row 1026), the called and calling party address John+Alice (column 1008, row 1026), called party address John (column 1010, row 1026), the calling party address Alice (column 1012, row 1026) and the Peer IP address 10.10.10.1 (column 1014, row 1026).

Each SBC of the cluster will use this set of fault records to maintain a local crash count table in the SBC's memory or memory attached to the SBC. A default or configurable aging period for fault records is used, e.g., 30 minutes, so that only records within the aging period are maintained. An exemplary fault or crash count table is illustrated in table 1100 of FIG. 11 for when all five fault records illustrated in table 1000 are within the aging period. That is TS0, TS1, TS2, TS3, and TS4 are all within thirty minutes of each other when the aging period is thirty minutes.

Table 1100 of FIG. 11 illustrates a fault count or crash table for the five faults whose information is provided in Table 1000. Table 1100 includes rows 1108, 1110, 1112, 1114, 1116, 1118, 1120, 1122, 1124, 1126, 1128, 1130, 1132, 1134, 1136, 1138, 1140. Row 1108 does not include information regarding the faults or how they are classified but has been included for explanatory purposes as it provides headings or labels identifying the information contained in each of the columns 1102, 1104, and 1106 of the table 1100. Column 1102 includes the key type, that is the key information about the received message which caused the crash or was being processed at the time of the crash as indicated by the column heading Key Type (column 1102, row 1108). Each of the rows 1108, 1110, 1112, 1114, 1116, 1118, 1120, 1122, 1124, 1126, 1128, 1130, 1132, 1134, 1136, 1138, 1140 of the table 1100 includes information corresponding to the key type of information that is included in the row as identified in column 1102. There are five key types being used to classify or identify the potential sources of the faults in this example, Call ID, Called+Calling Party, Called Party, Calling Party, and Peer IP address as previously discussed. Column 1104 includes the key value, that is the key information about the received message which caused the crash or was being processed at the time of the crash as indicated by the column heading Key Value (column 1104, row 1108). Column 1106 includes the fault or crash count for all of the SBCs in the cluster of SBCs corresponding to the key type and the particular key value in the same row of table 1100 as indicated by the column heading Fault/Crash Count (column 1106, row 1108). For example, row 1110 of the table identifies that for Key Type Call ID (column 1102, row 1110) having Key Value Y 123 (column 1104, row 1110) there was 1 fault/crash (column 1106, row 1110) among the SBCs of the cluster of SBCs within the aging period. The fault/crash count table 1100 tracks key values from messages being processed during a messaging processing fault of the SBCs of the SBC cluster over an aging time period or window based on key type and key values from the faults/crashes during the aging time period or window. This information is then used to make a determination as to whether received messages containing the key values should be blocked or dropped to prevent potential catastrophic faults or crashes by the SBCs of the cluster and to prevent packet or message fault avalanches which affect the entire cluster of SBCs. As the received messages in the present example are related to calls, e.g., Voice Over Internet Protocol calls, blocking of received messages containing key values in some cases results in call blocking. For example, when SIP messages having a CALL-ID are dropped based on the CALL-ID key value this results in call blocking for calls having the blocked Call-ID. Similarly, calls from a calling party are blocked when messages, e.g., SIP INVITE request messages, include a calling party key value that is a blocked calling party key value.

Row 1112 of the table identifies that for Key Type Call ID (column 1102, row 1112) having Key Value Y 234 (column 1104, row 1112) there was 1 fault/crash (column 1106, row 1112) among the SBCs of the cluster of SBCs within the aging period. Row 1114 of the table identifies that for Key Type Call ID (column 1102, row 1114) having Key Value Y 345 (column 1104, row 1114) there was 1 fault/crash (column 1106, row 1114) among the SBCs of the cluster of SBCs within the aging period. Row 1116 of the table identifies that for Key Type Call ID (column 1102, row 1116) having Key Value Y 456 (column 1104, row 1116) there was 1 fault/crash (column 1106, row 1116) among the SBCs of the cluster of SBCs within the aging period. Row 1118 of the table identifies that for Key Type Call ID (column 1102, row 1118) having Key Value Y 567 (column 1104, row 1118) there was 1 fault/crash (column 1106, row 1118) among the SBCs of the cluster of SBCs within the aging period. Row 1120 of the table identifies that for Key Type Called+Calling (column 1102, row 1120) having Key Value BOB+ALICE (column 1104, row 1120) there was 1 fault/crash (column 1106, row 1120) among the SBCs of the cluster of SBCs within the aging period. Row 1122 of the table identifies that for Key Type Called+Calling (column 1102, row 1122) having Key Value BOB+HENRY (column 1104, row 1122) there was 2 faults/crashes (column 1106, row 1122) among the SBCs of the cluster of SBCs within the aging period. Row 1124 of the table identifies that for Key Type Called+Calling (column 1102, row 1124) having Key Value BOB+JOHN (column 1104, row 1124) there was 1 fault/crash (column 1106, row 1124) among the SBCs of the cluster of SBCs within the aging period. Row 1126 of the table identifies that for Key Type Called+Calling (column 1102, row 1126) having Key Value JOHN+ALICE (column 1104, row 1126) there was 1 fault/crash (column 1106, row 1126) among the SBCs of the cluster of SBCs within the aging period. Row 1128 of the table identifies that for Key Type Called Party (column 1102, row 1128) having Key Value BOB (column 1104, row 1130) there was 4 faults/crashes (column 1106, row 1128) among the SBCs of the cluster of SBCs within the aging period. Row 1130 of the table identifies that for Key Type Called Party (column 1102, row 1130) having Key Value JOHN (column 1104, row 1130) there was 1 fault/crash (column 1106, row 1130) among the SBCs of the cluster of SBCs within the aging period. Row 1132 of the table identifies that for Key Type Calling Party (column 1102, row 1132) having Key Value ALICE (column 1104, row 1132) there was 2 faults/crashes (column 1106, row 1132) among the SBCs of the cluster of SBCs within the aging period. Row 1134 of the table identifies that for Key Type Calling Party (column 1102, row 1134) having Key Value HENRY (column 1104, row 1134) there was 2 faults/crashes (column 1106, row 1134) among the SBCs of the cluster of SBCs within the aging period. Row 1136 of the table identifies that for Key Type Calling Party (column 1102, row 1136) having Key Value JOHN (column 1104, row 1136) there was 1 faults/crashes (column 1106, row 1136) among the SBCs of the cluster of SBCs within the aging period. Row 1138 of the table identifies that for Key Type Peer IP address (column 1102, row 1138) having Key Value 10.10.10.1 (column 1104, row 1138) there was 3 faults/crashes (column 1106, row 1138) among the SBCs of the cluster of SBCs within the aging period. Row 1140 of the table identifies that for Key Type Peer IP address (column 1102, row 1140) having Key Value 10.10.5.1 (column 1104, row 1140) there was 2 faults/crashes (column 1106, row 1140) among the SBCs of the cluster of SBCs within the aging period.

Figure 12:
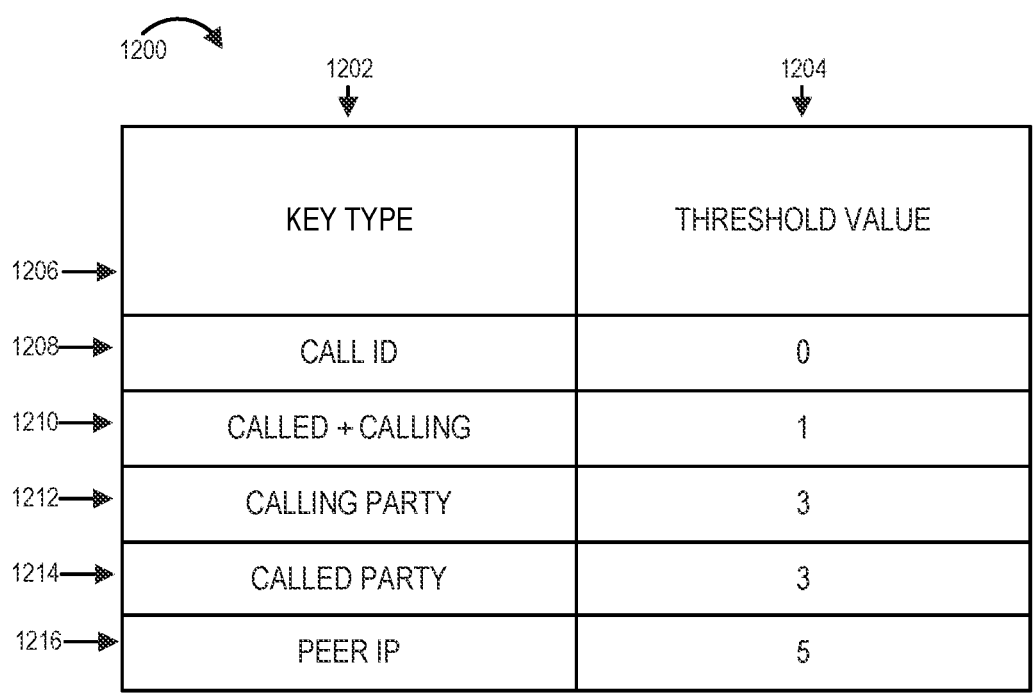
FIG. 12 illustrates an exemplary key type threshold value table in accordance with an embodiment of the present invention.

A threshold value for each key type is assigned and stored in memory in association with the key type. The threshold value indicates the maximum number of allowed faults or crashes for a particular key value of the key type before messages including the key value will be "blocked" or "dropped". The threshold values for one or more of the key types are in some embodiments configurable. The threshold values are defined in a manner that ensures that threshold for "more specific" blocks will be triggered before "less specific" blocks. "More specific" blocks are blocks that block fewer SIP messages than "less specific" blocks. For example, take the case where telephone numbers and portions of telephone numbers are used as the key value. 234-235-5678 is a valid telephone number with area code 234, central office prefix (exchange) 235, and line number 5678. A block of an individual telephone number, e.g., 234-235-5678, blocks a specific or individual end point. A block of a telephone exchange, 234-235, blocks all endpoints within the telephone exchange. A block of an area code, e.g., 234, blocks all endpoints within the area code. Similarly, a block of a country code blocks all endpoints within the country to which the code applies. In such a case, the individual telephone number is the most specific, the telephone exchange is the second most specific, the area code the third most specific and the country the fourth most specific or the least specific. The less specific blocks which affect more addresses or calls will have higher thresholds as the result of a false positive regarding an identified key value will have a wider negative impact on SIP messaging that should not be blocked as these messages will not cause a catastrophic fault. An exemplary set of key type thresholds are shown in table 1200 of FIG. 12. Table 1200 of FIG. 12 illustrates a key type threshold table that may be, and in some embodiments is, stored as a record, for five key types, the key type threshold value being the number of catastrophic faults or crashes as tracked by the fault/crash counts allowed during the aging time period for a key value of the key type. Once the key type threshold value has been exceeded for the key value of that key type, messages containing the key value are blocked or dropped during a verification check during input processing of the message or in a pre-processing message verification message input stage. Table 1200 includes rows 1206, 1208, 1210, 1212, 1214, and 1216. Row 1206 does not include information regarding the key types or threshold values but has been included for explanatory purposes as it provides headings or labels identifying the information contained in each of the columns 1202 and 1204 of the table 1200. Column 1202 includes the key type, that is the key type information about the received message which caused the crash or was being processed at the time of the crash as indicated by the column heading Key Type (column 1202, row 1206). Each of the rows 1208, 1210, 1212, 1214, and 1216 of the table 1200 includes a key type of information that is included in the row as identified in column 1202. There are five key types being used to classify or identify the potential sources of the faults in this example, Call ID, Called+Calling Party, Calling Party, Called Party, and Peer IP address as previously discussed. Column 1204 includes the threshold value for the key type in the same row as indicated by the column heading Threshold Value (column 1204, row 1206). In this example, the Key Type Call-ID is the most specific as it affects messages for a particular call having the Call-ID. The called party+calling party combination key type is second most specific as it affects messages including a specific calling party and called party combination. The calling party and called party are the next most specific as both affect messages for a single endpoint either the calling party or the called party. The next most specific Key Type is source IP which is the least specific because a Peer Internet Protocol address affects all messages from a peer device, e.g., an intermediary device such as a gateway to another network through which messages from the other network are received regardless of the endpoint from which the messages originated. The higher threshold values for the lesser specific key types provides for the lesser impact on users when there are false positives which occur when the Key Value is not the actual cause of a catastrophic fault or failure but has been incorrectly identified as the cause or potential cause of the catastrophic fault or failure.

Row 1208 of table 1200 indicates that for Key Type Call ID (column 1202, row 1208) the threshold value is 0 (column 1204, row 1208). Row 1210 of table 1200 indicates that for Key Type Called Party+Calling Party (column 1202, row 1210) the threshold value is 1 (column 1204, row 1210). Row 1212 of table 1200 indicates that for Key Type Calling Party (column 1202, row 1212) the threshold value is 3

(column 1204, row 1212). Row 1214 of table 1200 indicates that for Key Type Called Party (column 1202, row 1214) the threshold value is 3 (column 1204, row 1214). Row 1216 of table 1200 indicates that for Key Type Peer ID (column 1202, row 1216) the threshold value is 5 (column 1204, row 1216). The threshold values increase from the most specific Key Type Call ID to the least specific Key Type Peer IP with the threshold value for the Key Types Calling Party and Called Party being the same as they are at the same level of specificity regarding the number of endpoints being affected. If the fault or crash count for a key value for a key type exceeds the threshold value, received messages including the key value will be dropped during a verification check on the received message which is done prior to the commencement of the processing of the message by the SBC or at an early stage of processing of the message.

For the exemplary fault history provided in table 1000 and the exemplary key type threshold values provided in table 1200, the key values in table 1300 of FIG. 13 will be marked or identified for blocking or dropping by every SBC in the cluster of SBCs. If a key value is designated to be blocked or dropped, then any message, e.g., SIP message, containing that key value will be blocked or dropped during a verification check or test sometimes referred to as a catastrophic fault verification check or test performed at a pre-processing or early stage, of processing, e.g., input processing, of the message for example upon receipt and parsing of the message, the SIP message or packet also being defined to include the IP packet header, e.g., IPv4 or IPv6 packet header, for the SIP message. In some embodiments, the Peer IP address is extracted from the IP packet header of the received message.

FIG. 13 illustrates blocking table 1300, also sometimes referred to as a message dropping table. The blocking table 1300 includes rows 1306, 1308, 1310, 1312, 1314, 1316, 1318, and 1320. Row 1306 does not include information regarding the key types or blocked value but has been included for explanatory purposes as it provides headings or labels identifying the information contained in each of the columns 1302 and 1304 of the table 1300. Column 1302 includes the key type as indicated by the column heading Key Type (column 1302, row 1306). Each of the rows 1308, 1310, 1312, 1314, 1316, 1318 and 1320 of the table 1300 includes a key type that is included in the row as identified in column 1302. There are five key types being used to classify or identify the potential sources of the faults in this example, Call ID, Called+Calling Party, Calling Party, Called Party, and Peer IP address as previously discussed. Column 1304 includes the blocked key value for the key type in the same row as indicated by the column heading Blocked Value (column 1304, row 1306).

Row 1308 of table 1300 indicates that for Key Type Call ID (column 1302, row 1308) the key value Y123 (column 1304, row 1308) is a blocked key value. Row 1310 of table 1300 indicates that for Key Type Call ID (column 1302, row 1310) the key value Y234 (column 1304, row 1310) is a blocked key value. Row 1312 of table 1300 indicates that for Key Type Call ID (column 1302, row 1312) the key value Y345 (column 1304, row 1312) is a blocked key value. Row 1314 of table 1300 indicates that for Key Type Call ID (column 1302, row 1314) the key value Y456 (column 1304, row 1314) is a blocked key value. Row 1316 of table 1300 indicates that for Key Type Call ID (column 1302, row 1316) the key value Y567 (column 1304, row 1316) is a blocked key value. Row 1318 of table 1300 indicates that for Key Type Calling+Called (column 1302, row 1318) the key value BOB+HENRY (column 1304, row 1318) is a blocked key value. Row 1320 of table 1300 indicates that for Key Type Called Party (column 1302, row 1320) the key value BOB (column 1304, row 1320) is a blocked key value.

FIG. 14 illustrates flowchart of an exemplary method 1400 of input processing of an SBC in the cluster of SBCs for received messages, e.g., SIP messages, when the key type blocking table 1300 is being used by the SBC. The method 1400 will be described in connection with exemplary system 100 of FIG. 1 and cluster of Session Border Controller 201 illustrated in FIG. 2.

The method 1400 begins in start step 1402. Operation proceeds from step 1402 to step 1404.

In step 1404, a session border controller (SBC) receives a message, e.g., a SIP message with an IP header. The SBC may be for example SBC 1 132 of the plurality of SBCs forming the SBC cluster 118 or the SBC 202 of the plurality of SBCs forming the SBC cluster 202. The SBC may be, and in some embodiments is, implemented in accordance with the SBC 300 of FIG. 3. The message may be for example a message including a SIP INVITE request to initiate a call between end node 1A 108 and end node NA 114 with the SIP INVITE message originating from the end node 1A 108 and traversing access point 1 104, gateway 3 126 and being received by SBC 1 132. Operation proceeds from step 1404 to step 1406.

In step 1406, the SBC identifies and/or extracts key values including Call-ID, called+calling party, calling party, called party, and peer device Internet Protocol Address from the received message, e.g., from SIP header information and/or IP header information of the message. Operation proceeds from step 1406 to step 1408.

In step 1408, the SBC performs a message processing fault verification check or test on the received message. When the received message passes the message processing verification check or test, the received message is passed to the normal message processing routine of the SBC wherein the SBC performs normal message processing on the received message. When the received message fails the message processing fault verification check or test, the received message is dropped and no further processing is performed by the SBC on the received message. The message processing verification check or test includes in some embodiments comparing each of the extracted key values to key values of the same key value type that have been listed or identified to be blocked. In this example, table 1300 includes the blocked key values.

In some embodiments, step 1408 includes sub-steps 1410, 1412, 1414, 1416, 1418, 1420 and 1422. In decision sub-step 1410, a determination is made as to whether the extracted Call-ID key value from the received message is above the Call-ID Key Type threshold of 0 which is shown in table 1200 of FIG. 12. When the determination is made that the extracted Call-ID key value is above the threshold of 0 then operation proceeds from sub-step 1410 to sub-step 1422. When the determination is made that the extracted Call-ID key value is not above the threshold of 0 then operation proceeds from sub-step 1410 to decision sub-step 1412. By way of example, when the extracted Call-ID key value from the received message is Y123 then operation proceeds from sub-step 1410 to sub-step 1422 as key value fault count for Y123 is 1 as shown in table 1100 and when the extracted Call-ID key value from the received message is Y894 then operation proceeds from sub-step 1410 to sub-step 1412 as the key value fault count for Y894 is 0 as this key value is not included in the key value fault table.

In decision sub-step 1412, a determination is made as to whether the extracted Called Party+Calling Party (also referred to as Called+Calling) key value from the received message is above the Called Party+Calling Party (also referred to as Called+Calling) Key Type threshold of 1 which is shown in table 1200 of FIG. 12. When the determination is made that the extracted Called+Calling key value is above the threshold of 1 then operation proceeds from sub-step 1412 to sub-step 1422. When the determination is made that the extracted Called+Calling key value is not above the threshold of 1 then operation proceeds from sub-step 1412 to decision sub-step 1414. By way of example, when the extracted Called+Calling key value from the received message is BOB+HENRY then operation proceeds from sub-step 1412 to sub-step 1422 as key value fault count for called+calling key value BOB+HENRY is 2 as shown in table 1100 and indicated by the called+calling key value BOB+HENRY being included the blocked key value table 1300 and when the extracted Called+Calling key value from the received message is BOB+ALICE then operation proceeds from sub-step 1412 to decision sub-step 1414 as the key value fault count for BOB+ALICE is 1 as shown in table 1100 of FIG. 11. As a result, the key value of BOB+ALICE is not included in the key value fault table 1300.

In decision sub-step 1414, a determination is made as to whether the extracted Calling Party key value from the received message is above the Calling Party Key Type threshold of 3 which is shown in table 1200 of FIG. 12. When the determination is made that the extracted Calling Party key value is above the threshold of 3 then operation proceeds from sub-step 1414 to sub-step 1422. When the determination is made that the extracted Calling Party key value is not above the threshold of 3 then operation proceeds from sub-step 1414 to decision sub-step 1416. In this example, there are no Calling Party key values which are above the threshold of 3 as shown in table 1200 and as such no calling key values are included among the blocked values in table 1300.

In decision sub-step 1416, a determination is made as to whether the extracted Called key value from the received message is above the Called Party Key Type threshold of 3 which is shown in table 1200 of FIG. 12. When the determination is made that the extracted Called Party key value is above the threshold of 3 then operation proceeds from sub-step 1416 to sub-step 1422. When the determination is made that the extracted Called Party key value is not above the threshold of 3 then operation proceeds from sub-step 1416 to decision sub-step 1418. By way of example, when the extracted Called Party key value from the received message is BOB then operation proceeds from sub-step 1416 to sub-step 1422 as called party key value fault count for Called Party key value BOB is 4 as shown in table 1100 and indicated by the Called Party key value BOB being included the blocked key value table 1300 and when the extracted Called Party key value from the received message is JOHN then operation proceeds from sub-step 1416 to decision sub-step 1418 as the Called Party key value fault count for JOHN is 1 as shown in table 1100 of FIG. 11. As a result, the called party key value of JOHN is not included in the key value fault table 1300.

In decision sub-step 1418, a determination is made as to whether the extracted Peer IP address key value from the received message is above the Peer IP address Key Type threshold of 5 which is shown in table 1200 of FIG. 12. When the determination is made that the extracted Peer IP address key value is above the threshold of 5 then operation proceeds from sub-step 1418 to sub-step 1422. When the determination is made that the extracted Peer IP address key value is not above the threshold of 5 then operation proceeds from sub-step 1418 to sub-step 1420. In this example, there are no Peer IP address key values which are above the threshold of 5 as shown in table 1200 and as such no Peer IP address key values are included among the blocked values in table 1300.

In sub-step 1420, the received message is determined to have passed the message processing fault verification check and the received message is passed to a normal message processing routine of the SBC. In some embodiments, the SBC just continues processing the message, e.g., when the message processing fault verification check is part of the input processing of the message.

In sub-step 1422, the received message is determined to have failed the message processing fault verification check and the received message is dropped.

Operation proceeds from step 1408 back to step 1404 where the next message is received and the operation of the SBC continues in accordance with steps of method 1400.

In some embodiments, the SBC as part of the message processing fault verification check determines whether any of the extracted key values is included in a key value block list for that key value type or in a key value block table, e.g., key value block table 1300, and blocks the message if any of the key values is included on the key value block list corresponding to the key values key type or in the key value block table. In some embodiments, the type of the key value is used as an index into the key value block table.

In some embodiments, the timestamp value in the fault record is the time at which the fault occurred plus a value T wherein T (e.g., 30 minutes) is an amount of time at which the fault record is to expire and be deleted. When the fault record expires, the key value fault/crash counts are updated to reflect the removal of the data from the expired fault record. After the key value fault/crash counts have been updated, the key value block list or table is updated. In some embodiments, the SBC processes the fault records to generate a key value blocking table such as for example the key value blocking table 1300 shown in FIG. 13. In some such embodiments, in the message processing fault verification step 1408, the SBC compares the key-type/key-value extracted from the packet against entries in the table 1300. If a matching entry is found in table 1300, the message is dropped. In such embodiments, the key value blocking table is keyed or indexed by key-type/key-value) based on the thresholds for the key-type. In such embodiments, the blocking table does not need to include blocking thresholds. If the key type/key value extracted from the received message matches a key type/key value entry in the key value blocking table the message is blocked, i.e., dropped or discarded. If the key type/key value extracted from the received message does not match a key type/key value entry in the key value blocking table, the message is not blocked or dropped but is passed on for normal processing. It is to be understood that a variety of different data structures, e.g., one or more tables, lists, arrays, and linked lists, may be used for storing the fault records, key type/key values, key type threshold values, and key values to be blocked. FIGS. 10, 11, 12 and 13 show an exemplary embodiment which utilizes tables. The sub-steps of the message processing fault verification check may be optimized for the particular data structures used for storing the information for performing the verification check. In some embodiments, separate key value block lists may be generated and used for key type. In some other embodiments, one key value block list is implemented as a linked list with each element of the linked list containing two fields a key type field and a key value field, the information contained in the key type and key value fields being compared to determine if an extracted key type/key value is to be blocked or dropped. If the extracted key type/key value matches the key type and key value fields in an element of the linked list then the message is dropped; otherwise the message is not dropped.

Figure 15A:
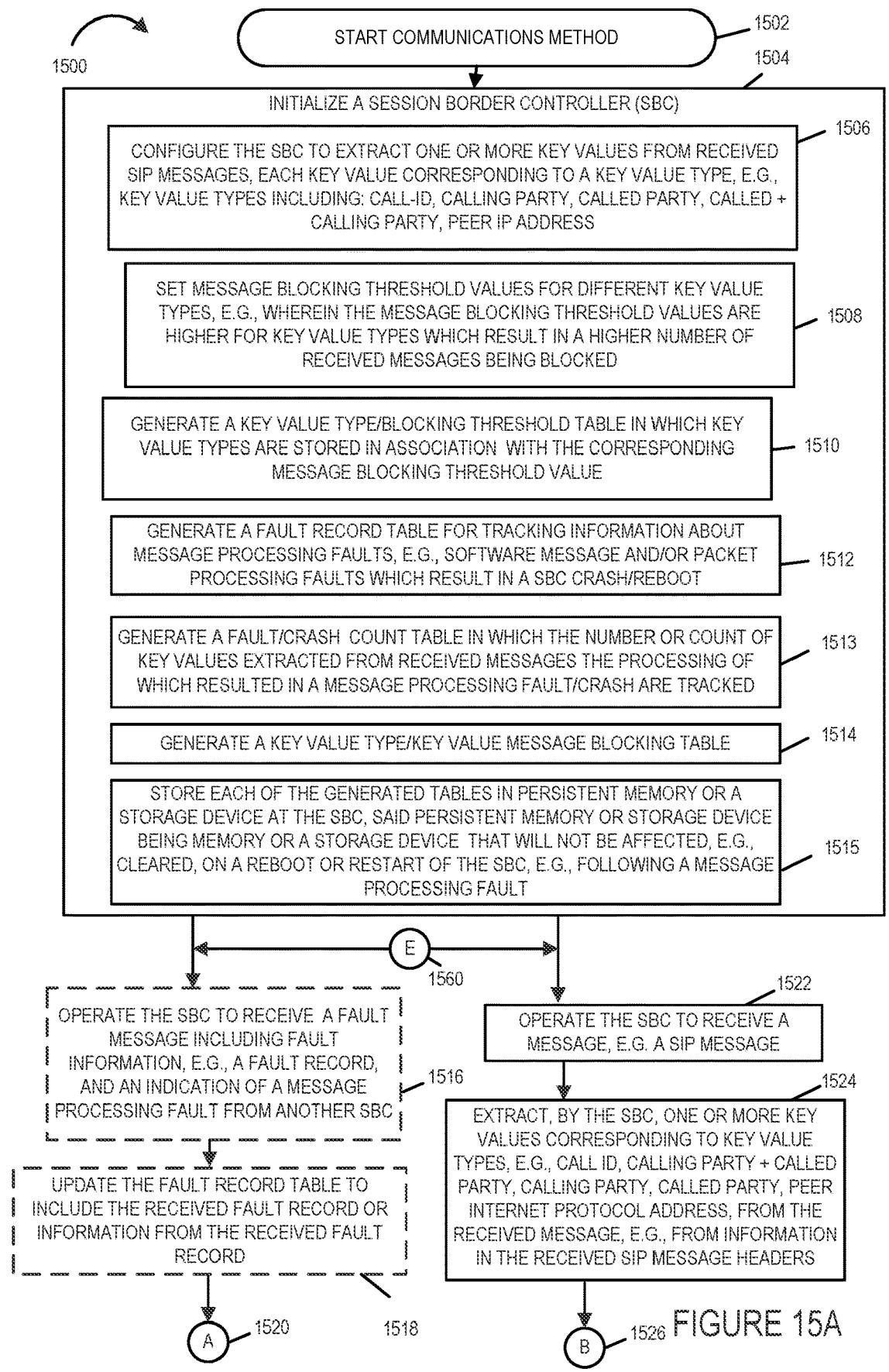
FIG. 15A illustrates the first part of a flowchart of an exemplary communications method in accordance with an embodiment of the present invention.
Figure 15B:
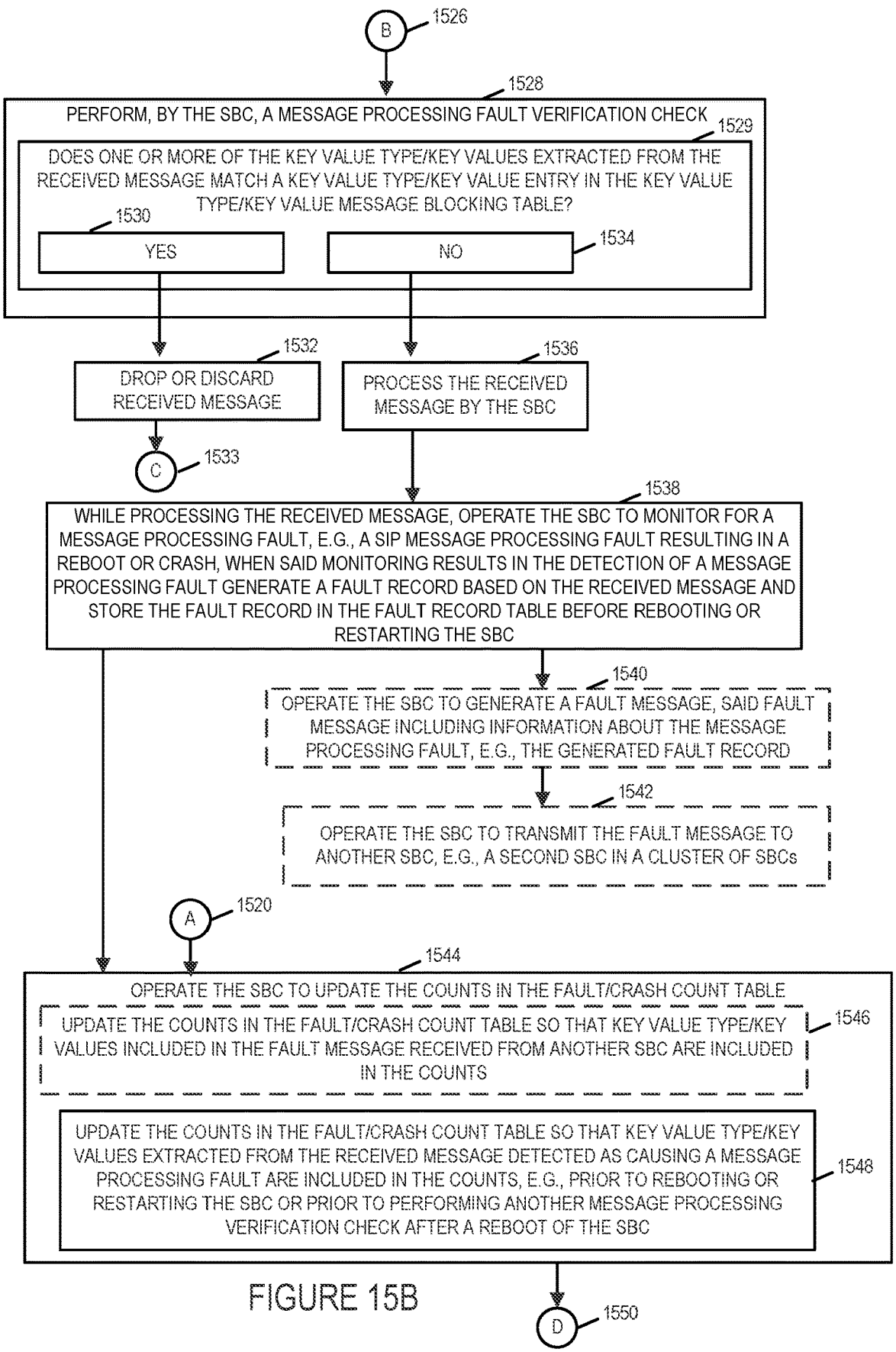
FIG. 15B illustrates the second part of a flowchart of an exemplary communications method in accordance with an embodiment of the present invention.

FIG. 15 illustrates the combination of FIGS. 15A, 15B and 15C. FIG. 15A illustrates the first part of a flowchart of an exemplary communications method 1500 in accordance with an embodiment of the present invention. FIG. 15B illustrates the second part of a flowchart of an exemplary communications method 1500 in accordance with an embodiment of the present invention. FIG. 15C illustrates the third part of a flowchart of an exemplary communications method 1500 in accordance with an embodiment of the present invention.

The exemplary method 1500 is a method for preventing message processing faults, e.g., fault avalanches, at a single SBC processing messages, e.g., SIP messages, or among a plurality or cluster of SBCs processing messages, e.g., SIP messages. While in the exemplary method 1500 only two SBCs are discussed for sake of simplicity and explanatory purposes, the method is not limited to two SBCs and can be extended to clusters of N SBCs where N is an integer greater than two. The method 1500 may be, and in some embodiments is, implemented using the system 100 of FIG. 1 and/or SBC cluster 201 of FIG. 2. In some embodiments, the first and second SBCs are implemented in accordance with SBC 300 illustrated in FIG. 3. In some embodiments, the SBCs are implemented as virtual SBCs as described in system 1700 illustrated in FIG. 17.

The communications method 1500 starts in start step 1502 shown in FIG. 15A. Operation proceeds from start step 1502 to initialization step 1504.

In step 1504 the Session Border Controller is initialized. In some embodiments, step 1506 includes one or more sub-steps 1506, 1508, 1510, 1512, 1513, 1514, and 1515. In sub-step 1506, the SBC is configured to extract one or more key values from received messages, e.g., SIP messages, each key value corresponding to a key value type, key value types including for example Call-ID, Called Party+Calling Party, Calling Party, Called Party, and Peer Internet Protocol address, in most, but not all, cases the extraction of the key values being from message header information, e.g., SIP message header such as for example the Call-ID header, From header, To header, Via header, P-Asserted-Identity header, and/or Remote-Party-ID header.

In sub-step 1508, the SBC sets message blocking threshold values for different key value types, the message blocking threshold values in some, but not all, embodiments being higher for key value types which result in a higher number of received messages being blocked, the message blocking threshold values being values when exceeded by the number of faults corresponding to the key value type/key value resulting in messages including the key value type/key value being blocked or dropped as discussed below.

In sub-step 1510, the SBC generates a key value type/message blocking threshold table in which key value types are stored in association with the corresponding message blocking threshold value. Table 1200 of FIG. 12 illustrates an exemplary key value type/message blocking threshold table.

In sub-step 1512 the SBC generates a fault record table for tracking information about message processing faults, e.g., software message and/or packet processing faults which result in a SBC crash/reboot or restart. Table 1000 of FIG. 10 illustrates an exemplary fault record table which has been populated with information about five faults or five fault records. The SBC fault record table generated during initialization will have no fault records.

In sub-step 1513 the SBC generates a fault/crash count table in which the number or count of key values extracted from received messages the processing of which resulted in a message processing fault/crash are tracked. The fault/crash table tracks the number of faults occurring over a time period, e.g., 30 minutes. Table 1100 of FIG. 11 is an exemplary fault/crash count table which is populated with information about the five faults whose information is contained in the five fault records shown in table 1000. The fault/crash count table generated during initialization will be empty as no messages have yet been received.

In sub-step 1514, the SBC generates a key value type/key value message blocking table. Table 1300 of FIG. 13 illustrates an exemplary key value type/key value blocking table which has been generated based on the information contained in the table 1200 which provides the key value type and corresponding message blocking threshold values and the fault/crash count table which shows the counts by key value type/key value for the five faults recorded in table 1000, the faults all having been assumed to be within the tracking time period. The SBC key value/key value message blocking table generated during initialization will be empty as there have been no faults or crashes yet.

In sub-step 1515, each of the generated tables are stored in persistent memory or a storage device at the SBC, the persistent memory or storage device being memory or storage such as ROM which will not be affected, e.g., cleared, on a reboot or restart of the SBC, for example following a message processing fault.

Operation proceeds from step 1504 to steps 1516 and 1522 in parallel or serial. Step 1516 is optional and is implemented for example when the SBC is part of a cluster of SBCs and the method is being used to protect against an avalanche fault in the SBC (crash/reboot cycle) as well as among the SBCs of the cluster.

In optional step 1516, the SBC is operated to receive from another SBC a fault message including fault information, e.g., a fault record, and an indication of a message processing fault. The fault information may be, and in some embodiments is, a fault record such as shown in row 1018 of table 1000. The other SBC from which the fault message is received may be for example another SBC in a cluster of SBCs in which this SBC is a member. Operation proceeds from optional step 1516 to optional step 1518.

In optional step 1518, the SBC is operated to update the fault record table which the SBC generated during initialization to include the received fault record or information from the received fault record. Operation proceeds from optional step 1518 via connection node A 1520 to step 1544 shown on FIG. 15B.

Returning to step 1522, in step 1522 the SBC is operated to receive a message, e.g., a SIP message, for processing. For example, the SIP message may be, and in some embodiments is, a SIP INVITE request to establish a Voice Over Internet IP call. Exemplary SIP message 900 is illustrated in FIG. 9. Operation proceeds from step 1522 to step 1524.

In step 1524, the SBC extract one or more key values corresponding to key value types, e.g., Call-ID, Called+Calling Party, Called Party, Calling Party and Peer IP address, from the received message, e.g., from information in the received SIP message headers, the SBC having been configured to extract the key value type/key values from the message in the sub-step 1506. Operation proceeds from step 1524 via connection node B 1526 to step 1528 shown on FIG. 15B.

In step 1528, the SBC is operated to perform a message processing fault verification check or test for the received message using the extracted key value type/key values. If the message processing fault verification check fails operation proceeds from step 1528 to step 1532. If the message processing fault verification check passes operation proceeds from step 1528 to step 1536. In some embodiments, the message processing verification check step includes sub-step 1529. In sub-step 1529, the SBC determines whether one or more of the key value type\key values extracted from the received message match a key value type\key value entry in the key value type\key value message blocking table. If the SBC determines that yes there is one or more matches then operation proceeds via determination sub-step 1530 to step 1532. In some embodiments as soon as one match is identified operation proceeds from step 1529 to step 1532 without determining if there is more than one match. If the SBC determines that there is not one or more matches, i.e., there are no matches, then operation proceeds from sub-step 1529 via determination sub-step 1534 to step 1536.

In step 1532, the SBC is operated to drop or discard the received message without further processing so as to prevent a possible message processing fault or crash. Operation proceeds from step 1532 via connection node C 1533 to step 1554 shown on FIG. 15C.

In step 1536, the received message, e.g., SIP message, is processed by the SBC. In step 1538, while processing the received message, e.g., SIP message, the SBC is operated to monitor for a message processing fault, e.g., a SIP message processing fault resulting in a crash and/or reboot and when the monitoring results in the detection of a message processing fault, the SBC is operated to generate a fault record in the fault record table before rebooting or restarting the SBC so that the fault record is not lost. The row 1018 includes an exemplary fault record. Operation proceeds from step 1538 to steps 1544 and in some embodiments, e.g., embodiments in which the SBC is one of a group or cluster of SBCs processing messages, to optional step 1540.

In optional step 1540, the SBC is operated to generate a fault message including information about the received message, e.g., key value type\key values extracted from the received message and the time of the fault's occurrence. The fault message typically will also include an indication that the fault message contains information about a message processing fault. The fault message may, and in some embodiments does, include the fault record generated based on the received message which is stored in the fault record table of the SBC. Operation proceeds from optional step 1540 to optional step 1542.

In optional step 1542, the SBC is operated to transmit the generated fault message to another SBC, e.g., a second SBC in a cluster of SBCs, for example, the SBC which generated the fault message based on the received message and the second SBC to which the fault message is sent both being members of the cluster of SBCs providing SIP message processing and other session border controller services.

In step 1544 the SBC is operated to update the counts in the fault/crash count table. In some embodiments, step 1544 includes sub-step 1546 and sub-step 1548. In sub-step 1546, the SBC is operated to update the counts in the fault/crash count table so that key value type/key values included in the fault message received from another SBC in step 1516 are in the key value type\key value fault/crash counts. In sub-step 1548, the SBC is operated to update the counts in the fault/crash count table so that the key value type/key values extracted from the received messaged detected as causing a message processing fault are included in the key value type\key value fault/crash counts. This update is done prior to rebooting or restarting the SBC or prior to performing another message processing verification check after a reboot of the SBC. Operation proceeds from step 1544 via connection node D 1550 to step 1554 shown on FIG. 15C.

In step 1554, the SBC is operated to update the key value type\key value fault counts in the key value fault/crash count table to exclude from the counts any faults that occurred more than a first amount of time prior to a current time, e.g., faults which occurred more than 30 minutes prior to the current time of the update. Operation proceeds from step 1554 to step 1556.

In step 1556, the SBC is operated to use the updated key value type\key value fault/crash counts to identify all key value type\key value entries having a count which exceeds the threshold value set for the key value type, the threshold value having been stored in the key value type threshold table. Operation proceeds from step 1556 to step 1558.

In step 1558, the SBC is operated to update the key value type\key value message blocking table entries so that only the identified key value type\key value entries from step 1556 are included in the key value type\key value blocking table. If a key value type\key value entry count has become equal to or less than the threshold value it is removed from the table and if a key value type\key value entry count is greater than or exceeds the threshold value it is added to the key value type\key value blocking table if it is not already an entry in the table. While in this embodiment the threshold value is set to be exceeded for the key value type\key value to be added to the message blocking table, it should be readily apparent that the threshold value could be set so that if the fault count is equal to or exceeds the threshold value the key value type\key value would be added to the message blocking table. Operation proceeds from step 1558 to optional step 1516 and step 1522 shown on FIG. 15A via connection node E 1560 from which method continues as previously described with the receipt of the next fault message in optional step 1516 and the receipt of the next message requesting SBC services in step 1522.

In some embodiments such as when the SBC is operated as a stand alone device and not as part of a cluster of SBCs, the optional steps 1516, 1518, 1540, 1542 and 1546 are not performed. In some embodiments, each member of a cluster of SBCs executes the method 1500.

Figure 16A:
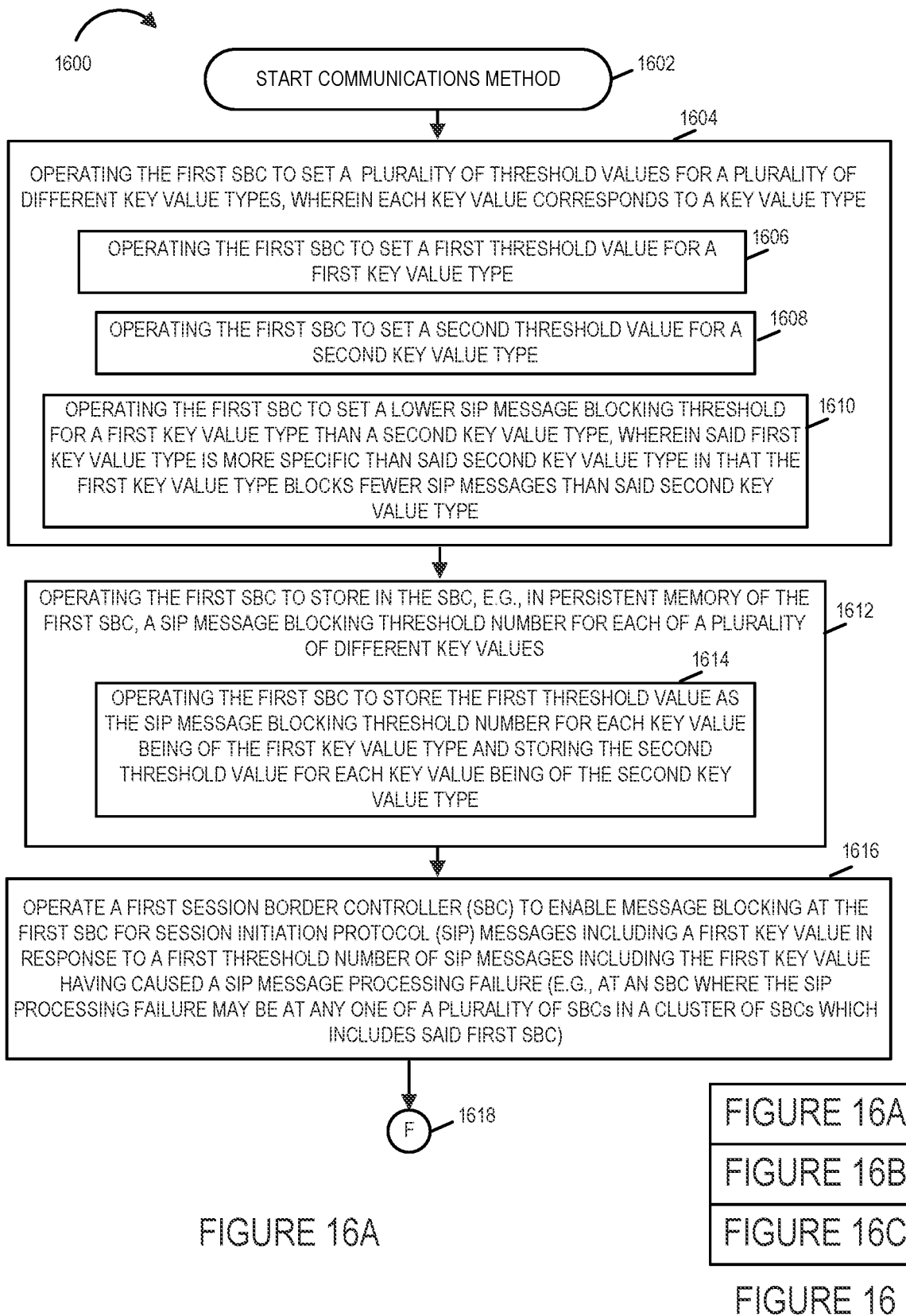
FIG. 16A illustrates the first part of a flowchart of an exemplary communications method in accordance with an embodiment of the present invention.
Figure 16B:
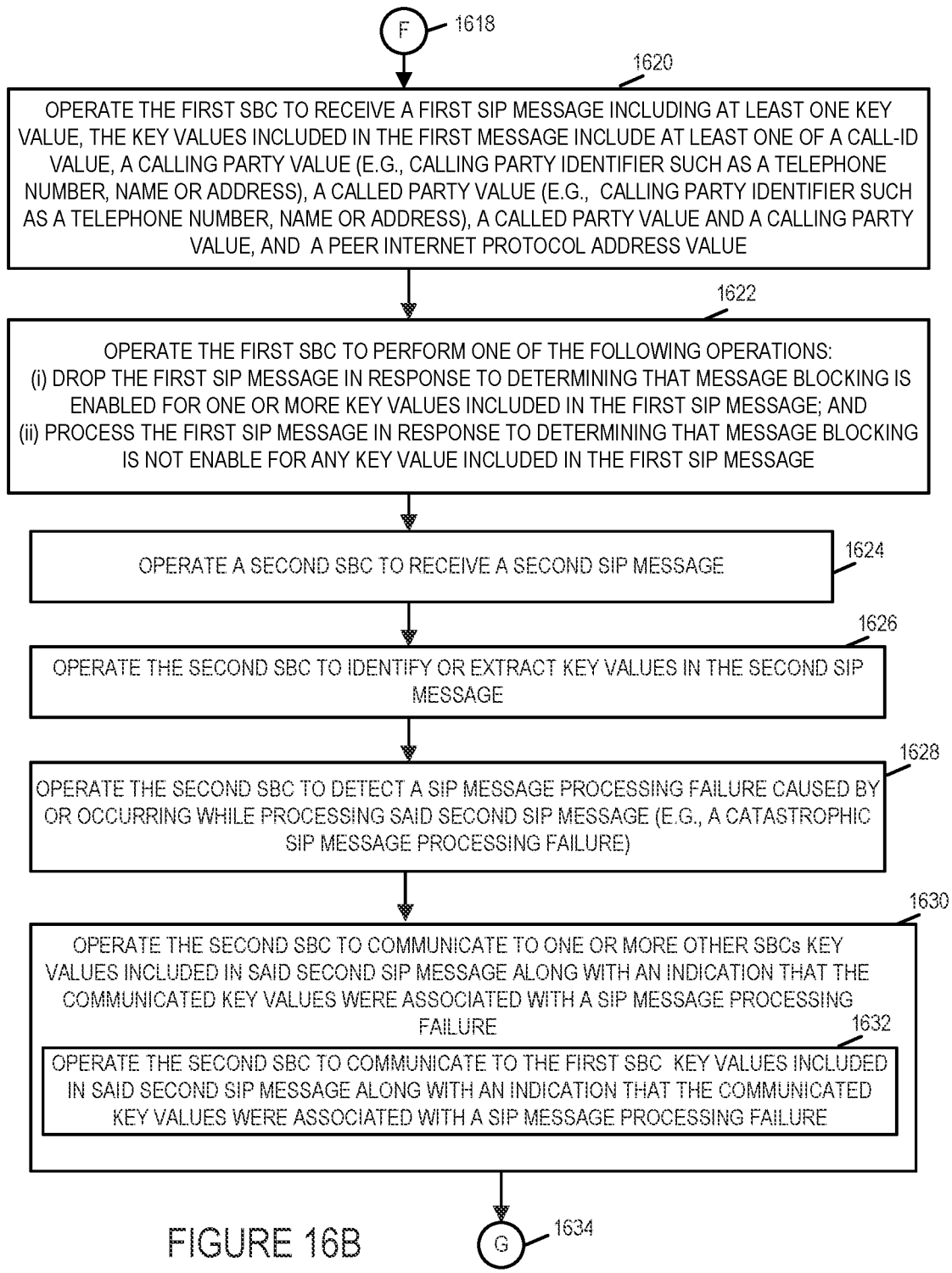
FIG. 16B illustrates the second part of a flowchart of an exemplary communications method in accordance with an embodiment of the present invention.
Figure 16C:
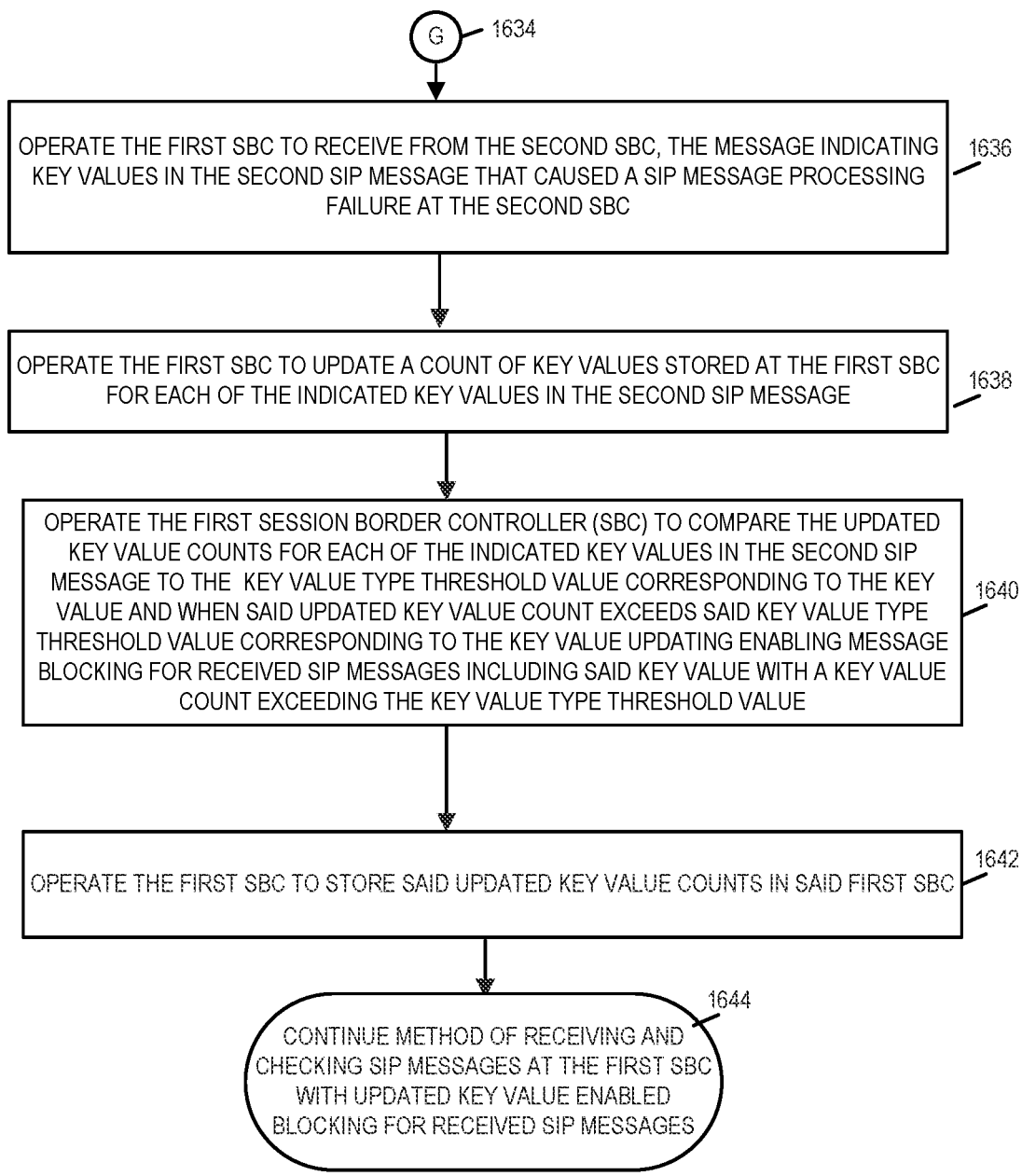
FIG. 16C illustrates the third part of a flowchart of an exemplary communications method in accordance with an embodiment of the present invention.

FIG. 16 illustrates the combination of FIGS. 16A, 16B and 16C. FIG. 16A illustrates the first part of a flowchart of a exemplary communications method 1600 in accordance with an embodiment of the present invention. FIG. 16B illustrates the second part of a flowchart of an exemplary communications method 1600 in accordance with an embodiment of the present invention. FIG. 16C illustrates the third part of a flowchart of an exemplary communications method 1600 in accordance with an embodiment of the present invention.

The exemplary method 1600 is a method for preventing fault avalanches at a single SBC processing SIP messages or among a plurality or cluster of SBCs processing SIP messages. While in the exemplary method 1600 only two SBCs are primarily discussed for sake of simplicity and explanatory purposes, the method is not limited to two SBCs and can be extended to clusters of N SBCs where N is an integer greater than two. The method 1600 may be, and in some embodiments is, implemented using the system 100 of FIG. 1 and/or SBC cluster 201 of FIG. 2. In some embodiments, the first and second SBCs are implemented in accordance with SBC 300 illustrated in FIG. 3. In some embodiments, the SBCs are implemented as virtual SBCs as described in system 1700 illustrated in FIG. 17.

The communications method 1600 starts in start step 1602 shown in FIG. 16A. Operation proceeds from start step 1602 to step 1604.

In step 1604, the first SBC, e.g., SBC 1 132, is operated to set a plurality of threshold values for a plurality of different key value types. Each key value used in the method corresponds to one of the plurality of key value types. Step 1604 in some embodiments includes one or more of the sub-steps 1606, 1608 and 1610. In sub-step 1606, the first SBC is operated to set a first threshold value for a first key value type. In sub-step 1608, the first SBC is operated to set a second threshold value for a second key value type. In sub-step 1610, the first SBC is operated to set a lower SIP message blocking threshold for a first key value type than a second key value type wherein said first key value type is more specific than said second key value type in that the first key value type blocks fewer SIP messages than said second key value type. Operation proceeds from step 1604 to step 1612.

In step 1612, the first SBC is operated to store, in persistent memory of the first SBC, a SIP message blocking threshold number for each of a plurality of different key values. In some embodiments, step 1612 includes sub-step 1614. In sub-step 1614, the first SBC is operated to store the first threshold value as the SIP message blocking threshold number for each key value being of the first key value type and storing the second threshold value for each key value being of the second key value type. Operation proceeds from step 1612 to step 1616.

In step 1616, the first SBC is operated to enable message blocking at the first SBC for Session Initiation Protocol (SIP) messages including a first key value in response to a first threshold number of SIP messages including the first key value having caused a SIP message processing failure (e.g., at an SBC where the SIP message processing failure may be at any one of a plurality of SBCs in a cluster of SBCs which include said first SBC such as for example SBC 2 134, SBC 3 136, SBC 4 138, . . . , SBC N1 140 when the first SBC is SBC 1 132 of the 1st cluster of SBCs 118 of system 100. Operation proceeds from step 1616 via connection node F 1618 to step 1620 shown on FIG. 16B.

In step 1620, the first SBC is operated to receive a first SIP message including at least one of a Call-ID value, a calling party value (e.g., calling party identifier such as a telephone number, name or address), a called party value and calling party value, and a Peer Internet Protocol address value. These values are typically included in the header information for the message such as previously discussed in connection with message illustrated in diagram 900 of FIG. 9. The SIP message may have originated from end node 1A 108 of system 100 and be directed to end node 1B 112 of system 100. In some embodiments, the first SIP message is a SIP INVITE request message for establishing a Voice Over Internet Protocol (VOIP) call. Operation proceeds from step 1620 to step 1622.

In step 1622, the first SBC is operated to perform one of the following operations: (i) drop the first SIP message in response to determining that message blocking is enabled for one or more key values included in the first SIP message; and (ii) process the first SIP message in response to determining that message blocking is not enabled for any key value included in the first SIP message. Operation proceeds from step 1622 to step 1624.

In step 1624, operate a second SBC, e.g., SBC 2 134 of cluster of SBCs 118, to receive a second SIP message. Operation proceeds from step 1624 to step 1626.

In step 1626, operate the second SBC to identify or extract key values included in the second SIP message, e.g., including in the headers of the second SIP message. Operation proceeds from step 1626 to step 1628.

In step 1628, the second SBC is operated to detect a SIP message processing fault caused by or occurring while processing said second SIP message (e.g., a catastrophic SIP message processing fault such as for example a software fault that causes the second SBC to stop processing SIP messages, crash and/or reboot). Operation proceeds from step 1628 to step 1630.

In step 1630, the second SBC is operated to communicate to one or more other SBCs, e.g., the other SBCs of the cluster of SBCs 118, key values included in said second SIP message along with an indication that the communicated key values were associated with or correspond to a SIP message processing failure. In some embodiments, step 1630 includes sub-step 1632. In sub-step 1632, the second SBC is operated to communicate to the first SBC key values included in said second SIP message along with an indication that the communicated key values were associated with or correspond to a SIP message processing failure.

In some embodiments, in addition to the key values the second SBC also communicates to other SBCs the time that the SIP message processing occurred and/or the time the SIP message was received that caused the failure or was being processed at the time of the failure. In some embodiments, the second SBC communicates a fault record such as for example the fault record shown in row 1018 of table 1000 shown in FIG. 10. In some embodiments, the second SBC communicates the second SIP message that caused the SIP message processing fault or was being processed at the time of the message processing fault to other SBCs with an indication that the second SIP message corresponds to or is associated with a SIP message processing fault. In some such embodiments, the SBCs that receive the SIP message extract the key values from the second SIP message instead of or in addition to the second SBC extracting the key values communicated to the other SBCs. Operation proceeds from step 1630 to step 1636 shown on FIG. 16C via connection node G 1634.

In step 1636, the first SBC is operated to receive from the second SBC, the message indicating key values in the second SIP message that caused or was being processed during a SIP message processing failure at the second SBC. In other embodiments having additional SBCs, the other SBCs to which the message was sent by the second SBC will also be operated to receive the message indicating key values included in the second SIP message, the second SIP message that caused or was being processed during a SIP message processing failure at the second SBC. Operation proceeds from step 1636 to step 1638.

In step 1638, the first SBC is operated to update a count of key values stored at the first SBC for each of the indicated key values in the second SIP message based on the information communicated to the first SBC from the second SBC about the second SIP message. In other embodiments having additional SBCs, each of the other SBCs while be operated to update a count of key values stored at the other SBCs for each of the indicated key values in the second SIP message based on the information communicated to the other SBCs from the second SBC about the second SIP message. Operation proceeds from step 1638 to step 1640.

In step 1640, the first SBC is operated to compare the updated key value counts for each of the indicated key values in the second SIP message to the key value type threshold value corresponding to the key value and when said updated key value count exceeds said key value type threshold value corresponding to the key value the first SBC is operated to enable message blocking for received SIP messages including said key value with a key value count exceeding the key value type threshold value. In embodiments with other SBCs, the other SBCs also perform step 1640 with respect to updating the key value counts that is being maintained by the SBC and the updating of the enabling messaging blocking for key values with key value counts which exceed corresponding key value type threshold values. Operation proceeds from step 1640 to step 1642.

In step 1642, the first SBC is operated to store said updated key value counts in said first SBC. In embodiments with other SBCs, the other SBCs are each operated to store updated key value counts in the SBC, e.g., SBC memory. Operation proceeds from step 1642 to step 1644.

In step 1644, the method 1600 continues with receiving and checking of SIP message key values at the first SBC with updated key value enabled blocking for received SIP messages.

In some embodiments of the method 1600 as discussed above, the first and second SBCs are part of a plurality of SBCs forming a cluster of SBCs for processing incoming SIP messages. Each of the SBCs in the cluster of SBCs upon detection of a SIP message processing failure, e.g., a catastrophic SIP message processing failure, communicating key values extracted from or identified in the SIP message being processed by the SBC at the time of the SIP processing failure to the other SBCs of the cluster of SBCs. The method 1600 in some embodiments further includes the step of tracking SIP message processing failures by key value, said tracking SIP processing message failures by key value including updating by each SBC of the cluster a key value count for each key value included in a SIP message that caused or was being processed during a SIP processing message failure at any one of the SBCs in the cluster of SBCs during a first time period. In some such embodiments, the step of tracking includes storing by each SBC the updated key value counts with the corresponding key value in a record within the memory of the SBC.

The first period of time in some embodiments is a sliding time window. The sliding time window may be for example 30 minutes long which slides by an amount of time T. For example, if the window is 30 minutes T may be 1 minute, in which the 30 window slides every minute. If T is 5 minutes then the 30 minutes slides every 5 minutes. In some embodiments, the tracking further includes updating the key value counts to exclude key values from messages that caused or occurred during a SIP message processing failure not within said sliding time window based on a time stamp from which the key value was included or which represents the time the fault occurred. In some embodiments of the method 1600, each SBC stores key value counts or fault/crash counts for call-id values, calling party values (e.g., calling party identifiers such as telephone numbers, names or addresses), called party values (e.g., called party identifiers such as telephone numbers, names or addresses), called party and calling party values, and peer device Internet Protocol address values. Table 1100 shown in FIG. 11 is an example of the storage in a table or data array of key values fault/crash counts.

The data and/or records stored in tables 1000, 1100, 1200 and 1300 may be stored in a number of different data structures such as for example, data arrays, link links, and/or indexed memory. A SIP message processing fault avalanche scenario is prevented in the cluster of SBCs using the method 1600 because information, e.g., key values, about SIP messages causing message processing faults are detected by different SBCs of the cluster and communicated to the other SBCs of the cluster so that each of the SBCs of the cluster can track which key values are associated with message processing faults and when a threshold number of faults are attributed to the same key value the SBC may enable blocking or dropping of messages that include the problematic key value. In this way, while a number of SBCs may experience a message processing fault, e.g., a crash, before the threshold is exceeded once the threshold for the key value count is exceeded the remaining SBCs of the cluster will drop and not process the message and thereby avoid experiencing a message processing fault or crash.

FIG. 6 as discussed above is a drawing illustrating an assembly of components 600 which may be included in an exemplary computing node or device 300, e.g., SIP processing device such as a SBC or a gateway, when implemented as a node or device executing an application for message or packet fault detection and failure mitigation, e.g., SBC 1 132, SBC 2 134, SBC 3 136, SBC 4 138, . . . , SBC N1 140, SIP processing Node 1 142, SIP Processing Node 2 144, SIP Processing Node 3 146, SIP Processing Node 4 148, . . . , SIP Processing Node N2 150, Gateway 1 122, Gateway 2 124, Gateway 3 126, Gateway 4 128, . . . , Gateway N1 130 of FIG. 1 implemented in accordance with exemplary embodiment computing node 300. In some embodiments, the SBCs in FIG. 2 are implemented in accordance with the exemplary embodiment of computing node 300. Assembly of components 600 may be, and in some embodiments is, used in computing node 300. The components in the assembly of components 600 can, and in some embodiments are, implemented fully in hardware within the processor 306, e.g., as individual circuits. The components in the assembly of components 600 can, and in some embodiments are, implemented fully in hardware within the assembly of components 319, e.g., as individual circuits corresponding to the different components. In other embodiments some of the components are implemented, e.g., as circuits, within the processor 306 with other components being implemented, e.g., as circuits within assembly of components 319, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 310 of the computing node 300, with the components controlling operation of computing node 300 to implement the functions corresponding to the components when the components are executed by a processor, e.g., processor 306. In some such embodiments, the assembly of components 600 is included in the memory 310 as assembly of components 318. In still other embodiments, various components in assembly of components 300 are implemented as a combination of hardware and software, e.g., with another circuit external to the processor providing input to the processor 306 which then under software control operates to perform a portion of a component's function. While shown in the FIG. 3 embodiment as a single processor, e.g., computer, it should be appreciated that the processor 306 may be implemented as one or more processors, e.g., computers.

When implemented in software the components include code, which when executed by the processor 306, configure the processor 306 to implement the function corresponding to the component. In embodiments where the assembly of components 600 is stored in the memory 310, the memory 310 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the computing node or device 300 or elements therein such as the processor 306, to perform the functions of corresponding steps illustrated and/or described in the methods of flowchart of FIG. 14 and FIG. 16 and/or described with respect to any of the Figures. Thus the assembly of components 600 includes various components that perform functions of corresponding steps of FIGS. 14 and 16.

Assembly of components 600 includes components 602, 604, 606, 608, 610, 612, 614, 616, 618, 620, 622, 624, 626, 628, 630, 632, 634, 636, and 638. The control routines component 602 is configured to control the operation of the node or device. The communications component 604 is configured to provide communications functionality including communications signaling and support for various communications protocols and interfaces The key value type configuration component 608 configures key value types to be used by the node in performing key value verification checks or tests on incoming messages and/or packets. The key value type configuration component 608 also generates the various key value types tables to be utilized in message and/or packet processing fault detection and mitigation operations of the node.

The key value type threshold value setting component 610 sets values for each of the key value types configured to be used by the node in message and/or packet processing fault detection and mitigation operations.

The key value extractor component 612 identifies and/or extracts key values from received messages and/or packets, e.g., from SIP message headers.

The message/packet fault detection component 614 identifies messages and/or packets the processing of which caused or resulted in a message and/or packet fault, e.g., a catastrophic software fault that caused the node to stop processing messages and/or packets, caused the node to crash, and/or caused the node reboot or restart.

The fault record generator component 616 generates fault or crash records which include information about the fault including for example the time of the fault, the message that caused the fault or crash or was being processed at the time of the fault or crash, key values included in the message that caused or was being processed at the time of the fault or crash. The fault record generator component 616 in some embodiments generates fault record tables such as the table 1000 illustrated in FIG. 10. The fault record generator component 616 in some embodiments also communicates the generated fault record to other message and/or packet processing devices or nodes such as for example to other SBCs in a cluster of SBCs performing SIP message processing.

The fault/crash count by key value record generator component 618 generates or updates a count of the number of times a key value was included in a message that was being processed at the time of a crash or fault or caused a crash or fault typically within a preconfigured or defined aging time period. The fault/crash count in some embodiments generates fault/crash count tables such as the table 1100 illustrated in FIG. 11. In some embodiments, the fault/crash count by key value record generator component includes sub-component fault/crash count by key value update component 620 which updates the key value fault/crash counts.

The key value block list generator component 622 generates and updates a list of key values typically by key type used to identify received messages and/or packets which are to be blocked or dropped.

The key value block table generator component 624 generates a key value block table that is used to identify received messages and/or packets which are to be blocked or dropped. In some embodiments, the key value block table generates a key value block table such as for example the table 1300 illustrated in FIG. 13.

The message processing fault verification/test component 626 performs a fault verification check or test on a received message to determine whether to drop the received message or packet based on the determination to drop the message or packet or pass the message or packet to a processing routine. In some embodiments the message processing fault verification/test component 626 implements the step 1408 of method 1400.

The comparator component 628 compares key values extracted from messages and/or packets to key values of the same key type that have identified on a key value block list or in a key value block table.

The determinator component 630 makes determinations needed by the node including for example, determinations as to whether a comparison of a key value fault count to key value type threshold has been exceed, determinations as to whether to enable message blocking for key values, determining whether a message or packet has passed or failed a message processing verification check or test, determining whether to drop a message or packet or pass a message or packet on for processing.

The mode of operation component 632 determines the mode of operation active or standby the node is in or to be placed in.

The key value message blocking component 634 performs operations to determine if a message or packet is to be blocked because it contains a key value designated to be blocked, e.g., the key value is included in the key value block list or in the key value block table. The key value message blocking component 634 also blocks processing of messages or packets by dropping or deleting the message upon a determination that the message or packet is to be blocked.

The avalanche fault mitigation component 636 performs verification checks or tests and drops messages and/or packets that fail the verification check or test because the message or packet contains one or more key values that have been identified as potentially the cause of a threshold number of previous message or packet processing faults or within a cluster of processing devices, the message or packet processing faults for example being catastrophic software faults that result in a reboot or restart of the device performing the message or packet processing operation. The avalanche fault mitigation component 636 reduces the number of processing devices in a cluster experiencing a catastrophic fault through use of key values to detect problematic message and/or packets which should be dropped and not processed based on past experience with messages having the same key values in the past.

The storage component 638 stores and retrieves data, information, and instructions from storage devices including memory and/or database(s).

FIG. 7 as discussed above is a drawing illustrating an assembly of components 700 which may be included in an exemplary access point computing node or device 400 of FIG. 1 implemented in accordance with exemplary embodiment access point computing device/node 400. Assembly of components 700 may be, and in some embodiments is, used in access point computing device/node 400. The components in the assembly of components 700 can, and in some embodiments are, implemented fully in hardware within the processor 406, e.g., as individual circuits. The components in the assembly of components 700 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the computing node 400, with the components controlling operation of access point computing node 400 to implement the functions corresponding to the components when the components are executed by a processor, e.g., processor 406. In some such embodiments, the assembly of components 700 is included in the memory 410 as assembly of components 418. In still other embodiments, various components in assembly of components 400 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers.

When implemented in software the components include code, which when executed by the processor 406, configure the processor 406 to implement the function corresponding to the component. In embodiments where the assembly of components 700 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the access point computing node or device 400 or elements therein such as the processor 406, to perform the functions of corresponding steps illustrated and/or described in the methods of flowchart of FIG. 14 and FIG. 16 and/or described with respect to any of the Figures. Thus the assembly of components 700 includes various components that perform functions of corresponding steps of FIGS. 14 and 16.

Assembly of components 700 includes components 702, 704, 706, 708, 710, 712, 714, and 716. The control routines component 702 is configured to control the operation of the node or device. The communications component 704 is configured to provide communications functionality including communications signaling and support for various communications protocols and interfaces. The network address and port translation component provides network Internet Protocol and Port translations. The determinator component 708 makes determinations for the access point such as whether to provide access or deny access to various devices requesting access via the access point computing node/device. The network access interface component 710 provides an interface and protocol conversion for different networks to which the access node is connected. The network selection component 712 selects the network to which messages will be directed. The network signaling conversion component 714 performs signaling conversion as required to provide access to devices access to network using different signaling protocols than the devices requesting accessing. The network switching component 716 provides switching services in which the access point acts as a configurable and/or programmable switch for directing traffic, e.g., messages and packets passing through the access point node or device.

FIG. 8 as discussed above is a drawing illustrating an assembly of components 800 which may be included in an exemplary end node or device 500, e.g., smartphone, computer, of FIG. 1 implemented in accordance with exemplary embodiment end node 500. Assembly of components 800 may be, and in some embodiments is, used in access point computing device/node 500. The components in the assembly of components 800 can, and in some embodiments are, implemented fully in hardware within the processor 506, e.g., as individual circuits. The components in the assembly of components 800 can, and in some embodiments are, implemented fully in hardware within the assembly of components 519, e.g., as individual circuits corresponding to the different components. In other embodiments some of the components are implemented, e.g., as circuits, within the processor 506 with other components being implemented, e.g., as circuits within assembly of components 519, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 510 of the end node 500, with the components controlling operation of end node 500 to implement the functions corresponding to the components when the components are executed by a processor, e.g., processor 506. In some such embodiments, the assembly of components 800 is included in the memory 510 as assembly of components 518. In still other embodiments, various components in assembly of components 500 are implemented as a combination of hardware and software, e.g., with another circuit external to the processor providing input to the processor 506 which then under software control operates to perform a portion of a component's function. While shown in the FIG. 5 embodiment as a single processor, e.g., computer, it should be appreciated that the processor 506 may be implemented as one or more processors, e.g., computers.

When implemented in software the components include code, which when executed by the processor 506, configure the processor 506 to implement the function corresponding to the component. In embodiments where the assembly of components 800 is stored in the memory 510, the memory 510 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the access point computing node or device 400 or elements therein such as the processor 506, to perform the functions of corresponding steps illustrated and/or described in the methods of flowchart of FIG. 14 and FIG. 16 and/or described with respect to any of the Figures. Thus the assembly of components 800 includes various components that perform functions of corresponding steps of FIGS. 14 and 16.

Assembly of components 800 includes components 802, 804, 806, and 808. The control routines component 802 is configured to control the operation of the node or device. The communications component 804 is configured to provide communications functionality including communications signaling and support for various communications protocols and interfaces. The Voice Over Internet Application Component 806 handles the signaling and call processing for making VOIP calls. The determinator component 808 makes determinations for the end node/device for example whether to generate and send a SIP message to initiate a VOIP call in response to a user input.

Figure 17:
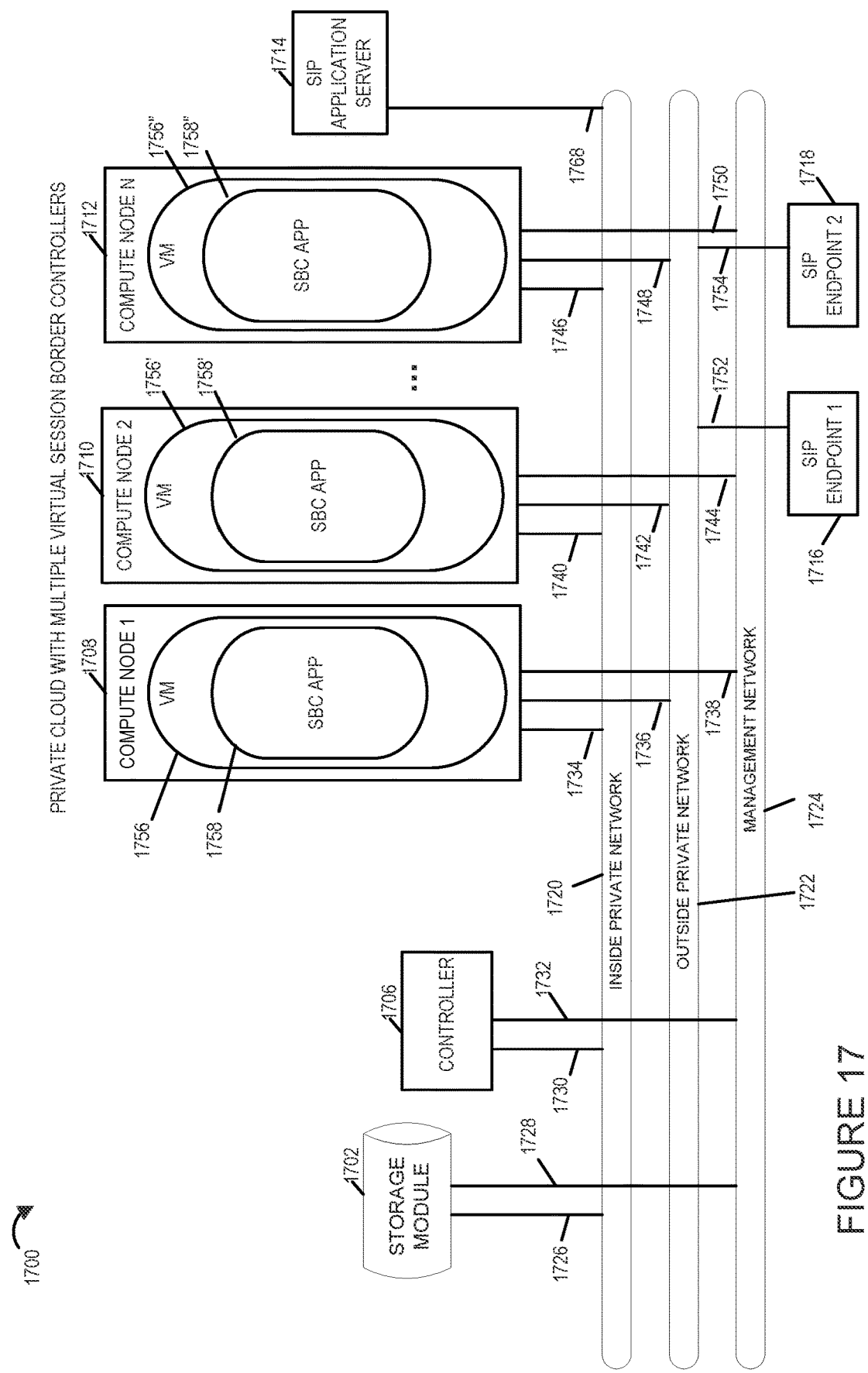
FIG. 17 is a drawing of an exemplary communications system including a private cloud with multiple virtual session border controllers in accordance with an exemplary embodiment of the present invention.

FIG. 17 illustrates an exemplary private cloud system 1700 with multiple virtual session border controllers in accordance with an embodiment of the present invention. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as session border controllers.

The system includes a storage module 1702, a controller 1706, a plurality of compute nodes, a SIP application server 1714, a SIP endpoint device 1 1716, a SIP endpoint device 2 1718, an inside private communications network 1720, an outside private communications network 1722, a management network 1724, and a plurality of communications links 1726, 1728, 1730, 1732, 1734, 1736, 1738, 1740, 1742, 1744, 1746, 1748, 1750, 1752, 1754, and 1768. The inside private communications network 1720, the outside private communications network 1722, the management network 1724, and the plurality of communications links 1726, 1728, 1730, 1732, 1734, 1736, 1738, 1740, 1742, 1744, 1746, 1748, 1750, 1752, 1754, and 1768 are used to exchange messages, information and instructions between the various devices, endpoints, nodes and entities in the system.

The plurality of compute nodes includes a compute node 1 1708, a compute node 2 1710, . . . , a compute node N 1712 where N is a positive number. The compute node 1 includes a virtual machine 1756 and a session border controller (SBC) application 1758. A compute node running a session border controller application, e.g., SBC APP 1758, is a virtualized session border controller. Each of the compute nodes 2 1710, . . . , N 1712 include a virtual machine and a SBC application. The plurality of compute nodes 1 . . . N executing software instructions to operate as a session border controller form a cluster of N SIP processing devices. When N=5, it forms a cluster of five virtual session border controllers similar to the five session border controllers of FIGS. 1 and 2. The resources, e.g., SIP processing capabilities, available to each of the virtual session border controllers may be, and typically is, different, for example based on how the virtual SBC is configured. The compute node 1 1708 is coupled to: the inside private network 1720 via communication link 1734, the outside private network 1722 via communications link 1736, and the management network 1724 via communications link 1738. The communications node 2 1710 is coupled to: the inside private network 1720 via communication link 1740, the outside private network 1722 via communications link 1742, and the management network 1724 via communications link 1744. The communications node N 1712 is coupled to: the inside private network 1720 via communication link 1746, the outside private network 1722 via communications link 1748, and the management network 1724 via communications link 1750.

The storage module 1702 is a storage device, e.g., memory, for storing instructions, information and data. The storage module 1702 is coupled to the inside private network 1720 via communications link 1726 and to the management network 1724 via communications link 1728.

The controller 1706 operates to configure and manage the private cloud system. The controller 1706 is coupled to the inside private network 1720 via communications link 1730 and the management network 1724 via communications link 1732. In some embodiments, the controller includes an orchestrator device or module, a Virtual Network Function manager device or module, and an element management system device or module. The orchestrator controls the orchestration and management of network function virtualized infrastructure and software resources and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualization of a network function. In this example, the virtualized network functions are session border controllers. The element management system or module performs management functions for one or several of the virtual network functions, e.g., virtual SBCs. Each compute node includes one or more processors. In some embodiments, one or more of the compute nodes in the system include a single processor upon which multiple virtual SBCs of the cluster are instantiated. In some embodiments, each virtual SBC of the cluster is a set of programming instructions forming a SBC application which is executed on a processor of a compute node.

The SIP application server 1714 is coupled to the inside private network 1720 via communications link 1768.

The SIP Endpoint device 1 1716 is coupled to the outside private network 1722 via communications link 1752. The SIP Endpoint 2 1718 is coupled to the outside private network 1722 via communications link 1754. In some embodiments, the system 1700 also includes a DNS server.

The methods and steps described in connection with any of FIGS. 14, 15, and 16 may also be implemented on the private cloud system 1700 of FIG. 17.

Figure 3:
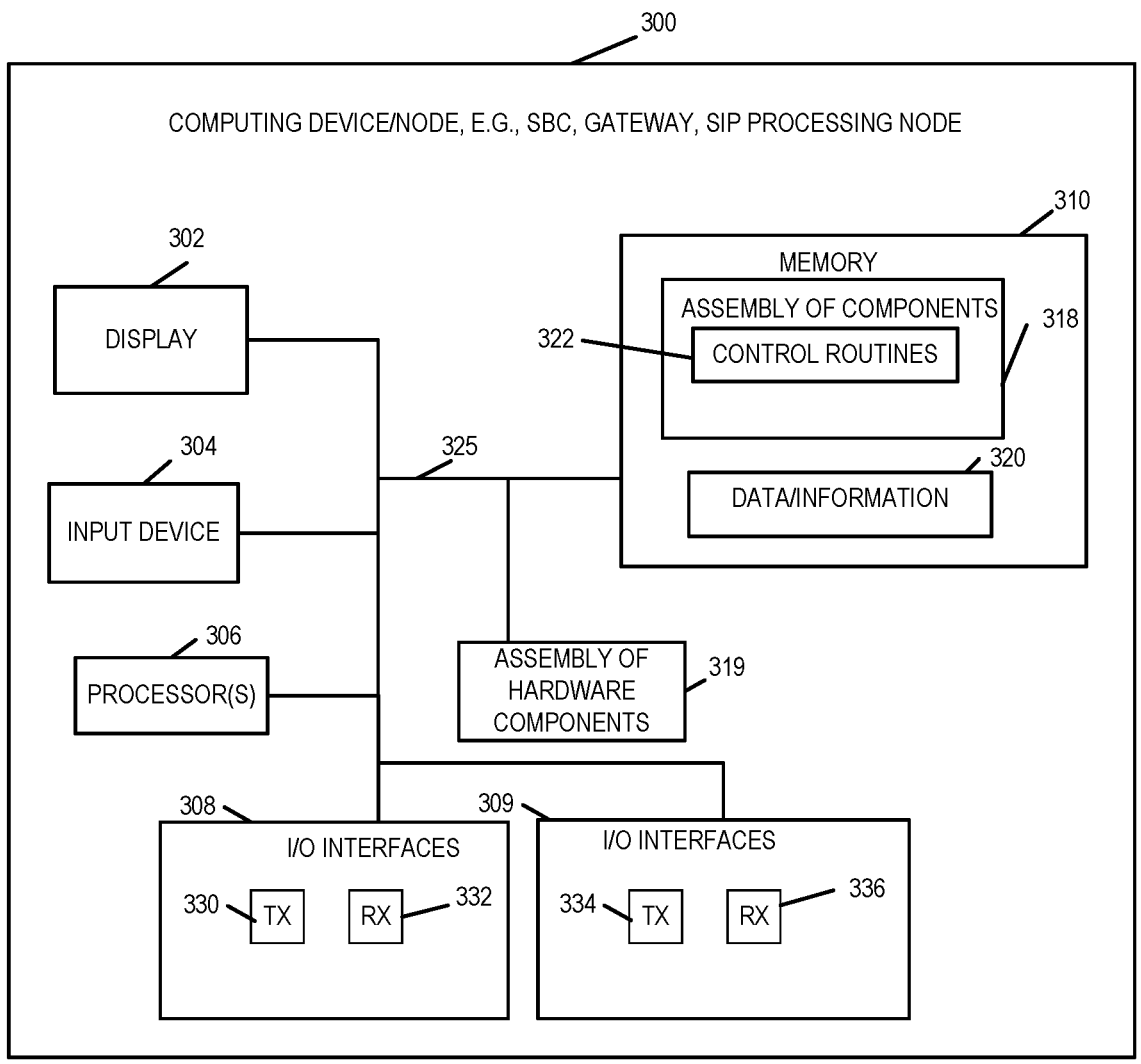
FIG. 3 illustrates an exemplary computing device/node, e.g., SBC, Gateway, Message/Packet Processing Node, e.g., SIP Processing Node in accordance with an embodiment of the present invention.

The virtual session border controllers are, e.g., session border controllers implementing a method in accordance with method 1400 of FIG. 14 and/or steps described above and/or implemented in accordance with SBC 300 of FIG. 3.

Each compute node (compute node 1 1708, compute node 2 1710, . . . , computer node N 1712) includes a virtual machine (VM 1756, VM 1756', . . . , VM 1756"), respectively. Each of the virtual machines (VM 1756, VM 1756', . . . , VM 1756") includes a session border controller (SBC) application (SBC APP 1758, SBC APP 1758', . . . , SBC APP 1758"), respectively. The plurality of virtual SBC illustrated in FIG. 17 forming a cluster of SBCs for processing incoming messages, SIP messages.

In some embodiments, a public cloud instead of a private cloud is implemented in which the multiple virtual SBCs are located in the public cloud instead of the private cloud.

In scenarios in which the specific type of fault cannot be known apriori, the aforementioned methods and apparatus make use of a hierarchy of key value message blocking thresholds that allow for the detection, reduction and/or prevention of message processing failures that can become cascading or avalanche faults in a cluster of messaging or packet processing devices by enabling blocking or dropping of messages including key values which exceed the key value message blocking thresholds. Furthermore, the solution is scalable as each message/packet processing device of the cluster maintains its owns key value fault/crash counts which reflect the message processing faults/crashes across the cluster of message/packet processing devices. Another advantage of various embodiments of the present invention is that they provide a way to limit the effect of message/packet processing faults, e.g., crashes and reboots, which cannot be predicted.

LIST OF EXEMPLARY NUMBERED METHOD EMBODIMENTS

Method Embodiment 1. A communications method, comprising: enabling message blocking at a first Session Border Controller (SBC) for Session Initiation Protocol (SIP) messages including a first key value in response to a first threshold number of SIP messages including the first key value having caused a SIP message processing failure (e.g. at an SBC where the SIP processing failure may be at any one of a plurality of SBCs in a cluster of SBCs which includes said first SBC); receiving, at the first Session Border Controller, a first Session Initiation Protocol (SIP) message including at least one key value; determining, at the first SBC, if message blocking is enabled for one or more key values included in the first SIP message; and performing, at the first SBC, one of: i) dropping the first SIP message in response to determining that message blocking is enabled for one or more key values included in the first SIP message; and ii) processing the first SIP message in response to determining that message blocking is not enabled for a key value included in the first SIP message.

Method Embodiment 2. The method of method embodiment 1, wherein said key values included in the first SIP message include at least one of a call-id value, a calling party value (e.g., calling party identifier such as a telephone number, name or address), a called party value (e.g., called party identifier such as a telephone number, name or address), a called party value and a calling party value, and a peer device Internet Protocol address value.

Method Embodiment 2A. The method of method embodiment 2, wherein the first SIP message is a SIP INVITE request message for a Voice Over Internet Protocol (VOIP) call.

Method Embodiment 3. The method of method embodiment 2, further comprising: receiving, at the first SBC, from a second SBC, a message indicating key values in a second SIP message that caused a SIP message processing failure at the second SBC; and updating a count of key values stored at the first SBC for each of the indicated key values in the second SIP message.

Method Embodiment 4. The method of method embodiment 3, further comprising: storing in the first SBC, a SIP message blocking threshold number for each of a plurality of different key values.

Method Embodiment 5. The method of method embodiment 4 further comprising: setting a first threshold value for a first key value type; setting a second threshold value for a second key value type; and wherein said storing in the first SBC, a SIP message blocking threshold number for each of a plurality of different key values includes storing the first threshold value as the SIP message blocking threshold number for each key value being of the first key value type and storing said second threshold value for each key value being of the second key value type.

Method Embodiment 6. The method of method embodiment 5 further comprising: setting a lower SIP message blocking threshold value for a first key value type than a second key value type; wherein each key value corresponds to a key value type; and wherein said first key value type blocks fewer SIP messages than said second key value type.

Method Embodiment 6A. The method of method embodiment 6, wherein said first key value type is a call-id key value type and said second key value type is a calling party key value type.

Method Embodiment 7. The method of method embodiment 3, further comprising: operating the second SBC to receive the second SIP message; identifying key values in the second SIP message; detecting at the second SBC a SIP message processing failure caused by the processing of said second SIP message (e.g., a catastrophic SIP message processing failure); and communicating to other SBCs key values included in said second SIP message along with an indication that the communicated key values were associated with a SIP message processing failure.

Method Embodiment 8. The method of method embodiment, wherein said first and second SBCs are part of a plurality of SBCs forming a cluster of SBCs, each of said SBCs in said cluster of SBCs upon the detection of a SIP message processing failure (e.g., a catastrophic SIP message processing failure) communicating key values extracted from the SIP message being processed by the SBC at the time of the SIP processing failure to the other SBCs of the cluster of SBCs.

Method Embodiment 9. The method of method embodiment 8 further comprising: tracking SIP message processing failures by key value, said tracking SIP processing message failures by key value including updating by each SBC of the cluster a key value count for each key value included in a SIP message that caused or was being processed during a SIP processing message failure at any one of the SBCs in the cluster of SBCs during a first time period.

Method Embodiment 10. The method of method embodiment 9, wherein said tracking includes storing by each SBC the updated key value counts with the corresponding key value in a record within the memory of the SBC.

Method Embodiment 10A. The method of method embodiment 10, wherein said first period of time is a sliding time window.

Method Embodiment 10B The method of method embodiment 10A wherein said tracking further includes updating the key value counts to exclude key values from messages that caused a SIP processing message failure not within said sliding time window based on a time stamp corresponding to the message from which the key value was included.

Method Embodiment 11. The method of method embodiment 10, wherein each SBC stores key value counts for call-id values, calling party values (e.g., calling party identifiers such as telephone numbers, names or addresses), called party values (e.g., called party identifiers such as telephone numbers, names or addresses), called party and calling party values, and peer device Internet Protocol address values.

Method Embodiment 12. A method comprising: receiving, by a first Session Border Controller (SBC), a first message including a plurality of message headers; performing, by the first SBC, a message processing failure verification check on the first message to determine whether to process said first message or drop said first message, the message processing failure verification check including: extracting, by the first SBC, one or more key values from one or more of the plurality of message headers; and determining, by the first SBC, whether to process said first message or to drop said first message based on said one or more extracted key values.

Method Embodiment 13. The method of method embodiment 12, wherein said first SBC is one of plurality of SBCs included in a cluster of SBCs; and wherein said first message includes a Session Initiation Protocol request.

Method Embodiment 14. The method of method embodiment 13 further comprising: storing at the first SBC a key value count for each key value extracted from a message being processed by one of the SBCs of the cluster of SBCs when said SBC experienced a message processing failure; and wherein said determining, by the first SBC, whether to process said first message or to drop said first message based on said one or more extracted key values from said first message includes comparing said one or more key values extracted from said first message to a key value drop list generated by the first SBC based on key values identified by SBCs of the cluster of SBCs as being extracted from messages being processed at a time when the SBC processing the message experienced a message processing failure.

Method Embodiment 14A. The method of method embodiment 12 further comprising: storing at the first SBC in persistent memory a key value count for each key value extracted from a message being processed by the first SBC when the first SBC experiences a message processing failure; and wherein said determining, by the first SBC, whether to process said first message or to drop said first message based on said one or more extracted key values from said first message includes comparing said one or more key values extracted from said first message to a key value drop list generated by the first SBC based on key values identified by the first SBC as being extracted from messages being processed at a time when the first SBC experienced a message processing failure.

Method Embodiment 14B. The method of method embodiment 14A, wherein the key value drop list is also stored in the persistent memory.

Method Embodiment 15. The method of method embodiment 14, wherein said message processing failure is a software failure in which the SBC which experiences the message processing failure requires rebooting of the SBC.

Method Embodiment 15A. The method of method embodiment 14, wherein said message processing failure is a software failure which causes the SBC which experiences the message processing failure to crash and cease to provide message processing services.

Method Embodiment 16. The method of method embodiment 14 further comprising: setting, by the first SBC, a key value type threshold value for each key value type, each key value corresponding to a key value type; generating, by the first SBC, the key value drop list by including on the key value drop list key values which have a key value count greater than the key value type threshold to which the key value corresponds.

Method Embodiment 17. The method of method embodiment 16 further comprising: receiving, by the first SBC, key values from other SBCs in the cluster of SBCs and an indication that said key values were extracted from a message which was being processed at the time the SBC detected or experienced a message processing fault.

Method Embodiment 18. The method of method embodiment 17, wherein said key values, said key value counts, and key value type threshold values are stored at the first SBC in persistent memory.

Method Embodiment 19. The method of method embodiment 18, wherein the cluster of SBCs includes N SBCs, N being a positive integer; wherein N−1 SBCs in the cluster of SBCs being in an active mode of operation for processing SIP messages and one SBC being in a standby mode of operation for processing SIP message; and wherein no key value type threshold value is greater than N−1.

Method Embodiment 20. The method of method embodiment 19 further comprising: a load balancer distributing incoming SIP messages to be processed by the cluster of SBCs among the SBCs of the cluster which are in an active mode of operation.

Method Embodiment 21. The method of method embodiment 12, wherein said first SBC determines to drop said first message based on one or more extracted key values to prevent a possible message processing fault occurring at the first SBC during processing of the first message.

LIST OF EXEMPLARY NUMBERED SYSTEM EMBODIMENTS

System Embodiment 1. A communications system, comprising: a first Session Border Controller (SBC) including a first processor configured to control the first SBC to perform the following operations: enable message blocking at the first Session Border Controller (SBC) for Session Initiation Protocol (SIP) messages including a first key value in response to a first threshold number of SIP messages including the first key value having caused a SIP message processing failure (e.g. at an SBC where the SIP processing failure may be at any one of a plurality of SBCs in a cluster of SBCs which includes said first SBC); receive, at the first Session Border Controller, a first Session Initiation Protocol (SIP) message including at least one key value; determine, at the first SBC, if message blocking is enabled for one or more key values included in the first SIP message; and perform, at the first SBC, one of: i) dropping the first SIP message in response to determining that message blocking is enabled for one or more key values included in the first SIP message; and ii) processing the first SIP message in response to determining that message blocking is not enabled for a key value included in the first SIP message.

System Embodiment 2. The communications system of system embodiment 1, wherein said key values included in the first SIP message include at least one of a call-id value, a calling party value (e.g., calling party identifier such as a telephone number, name or address), a called party value (e.g., called party identifier such as a telephone number, name or address), a called party value and a calling party value, and a peer device Internet Protocol address value.

System Embodiment 2A. The communications system of system embodiment 2, wherein the first SIP message is a SIP INVITE request message for a Voice Over Internet Protocol (VOIP) call.

System Embodiment 3. The communications system of system embodiment 2, wherein said first processor is further configured to control the first SBC to perform the following additional operations: receive, at the first SBC, from a second SBC, a message indicating key values in a second SIP message that caused a SIP message processing failure at the second SBC; and update a count of key values stored at the first SBC for each of the indicated key values in the second SIP message.

System Embodiment 4. The communications system of system embodiment 3, wherein said first processor is further configured to control the first SBC to perform the following additional operations: store in the first SBC, a SIP message blocking threshold number for each of a plurality of different key values.

System Embodiment 5. The communications system of system embodiment 4 wherein said first processor is further configured to control the first SBC to perform the following additional operations: set a first threshold value for a first key value type; set a second threshold value for a second key value type; and wherein said store in the first SBC, a SIP message blocking threshold number for each of a plurality of different key values, includes storing the first threshold value as the SIP message blocking threshold number for each key value being of the first key value type and storing said second threshold value for each key value being of the second key value type.

System Embodiment 6. The communications system of system embodiment 5, wherein said first processor is further configured to control the first SBC to perform the following additional operations: set a lower SIP message blocking threshold value for a first key value type than a second key value type; wherein each key value corresponds to a key value type; and wherein said first key value type blocks fewer SIP messages than said second key value type.

System Embodiment 6A. The communications system of system embodiment 6, wherein said first key value type is a call-id key value type and said second key value type is a calling party key value type.

System Embodiment 7. The communications system of system embodiment 3 further comprising a second SBC including a second processor, said second processor being configured to control the second SBC to perform the following operations: receive the second SIP message; identify key values in the second SIP message; detect at the second SBC a SIP message processing failure caused by the processing of said second SIP message (e.g., a catastrophic SIP message processing failure); and communicate to other SBCs key values included in said second SIP message along with an indication that the communicated key values were associated with a SIP message processing failure.

System Embodiment 8. The communication system of system embodiment 3, wherein said first and second SBCs are part of a plurality of SBCs forming a cluster of SBCs, each of said SBCs in said cluster of SBCs upon the detection of a SIP message processing failure (e.g., a catastrophic SIP message processing failure) communicating key values extracted from the SIP message being processed by the SBC at the time of the SIP processing failure to the other SBCs of the cluster of SBCs.

System Embodiment 9. The communications system of system embodiment 8 wherein each of SBCs in the cluster of SBC includes a processor that controls the SBC in which the processor is included to track SIP message processing failures by key value, said tracking SIP processing message failures by key value including updating by each SBC of the cluster a key value count for each key value included in a SIP message that caused or was being processed during a SIP processing message failure at any one of the SBCs in the cluster of SBCs during a first time period.

System Embodiment 10. The communications system of system embodiment 9, wherein said tracking includes storing by each SBC the updated key value counts with the corresponding key value in a record within the memory of the SBC.

System Embodiment 10A. The communications system of system embodiment 10, wherein said first period of time is a sliding time window.

System Embodiment 10B. The communications system of system embodiment 10A wherein said tracking further includes updating the key value counts to exclude key values from messages that caused a SIP processing message failure not within said sliding time window based on a time stamp corresponding to the message from which the key value was included.

System Embodiment 11. The communications system of system embodiment 10, wherein each of said processors included in each of said SBCs controls the SBC in which the processor is included to store key value counts for call-id values, calling party values (e.g., calling party identifiers such as telephone numbers, names or addresses), called party values (e.g., called party identifiers such as telephone numbers, names or addresses), called party and calling party values, and peer device Internet Protocol address values.

System Embodiment 12. A communications system comprising: a first Session Border Controller (SBC) including a first processor configured to control the first SBC to: receive, by a first Session Border Controller (SBC), a first message including a plurality of message headers; perform, by the first SBC, a message processing failure verification check on the first message to determine whether to process said first message or drop said first message, the message processing failure verification check including: extracting, by the first SBC, one or more key values from one or more of the plurality of message headers; and determining, by the first SBC, whether to process said first message or to drop said first message based on said one or more extracted key values.

System Embodiment 13. The communications system of system embodiment 12, wherein said first SBC is one of plurality of SBCs included in a cluster of SBCs; and wherein said first message includes a Session Initiation Protocol request.

System Embodiment 14. The communications system of system embodiment 13, wherein said first processor is further configured to control the first SBC to store at the first SBC a key value count for each key value extracted from a message being processed by one of the SBCs of the cluster of SBCs when said SBC experienced a message processing failure; and wherein said determining, by the first SBC, whether to process said first message or to drop said first message based on said one or more extracted key values from said first message includes comparing said one or more key values extracted from said first message to a key value drop list generated by the first SBC based on key values identified by SBCs of the cluster of SBCs as being extracted from messages being processed at a time when the SBC processing the message experienced a message processing failure.

System Embodiment 14A. The communications system of system embodiment 12, wherein said first processor is further configured to control the first SBC to at the first SBC in persistent memory a key value count for each key value extracted from a message being processed by the first SBC when the first SBC experiences a message processing failure; and wherein said determining, by the first SBC, whether to process said first message or to drop said first message based on said one or more extracted key values from said first message includes comparing said one or more key values extracted from said first message to a key value drop list generated by the first SBC based on key values identified by the first SBC as being extracted from messages being processed at a time when the first SBC experienced a message processing failure.

System Embodiment 14B. The communications system of system embodiment 14A, wherein the key value drop list is also stored in the persistent memory.

System Embodiment 15. The communications system of system embodiment 14, wherein said message processing failure is a software failure in which the SBC which experiences the message processing failure requires rebooting of the SBC.

System Embodiment 15A. The communications system of system embodiment 14, wherein said message processing failure is a software failure which causes the SBC which experiences the message processing failure to crash and cease to provide message processing services.

System Embodiment 16. The communications system of system embodiment 14, wherein said first processor is further configured to control the first SBC to: set a key value type threshold value for each key value type, each key value corresponding to a key value type; and generate the key value drop list by including on the key value drop list key values which have a key value count greater than the key value type threshold to which the key value corresponds.

System Embodiment 17. The communications system of system embodiment 16, wherein said first processor is further configured to control the first SBC to receive key values from other SBCs in the cluster of SBCs and an indication that said key values were extracted from a message which was being processed at the time the SBC detected or experienced a message processing fault.

System Embodiment 18. The communications system of system embodiment 17, wherein said key values, said key value counts, and key value type threshold values are stored at the first SBC in persistent memory.

System Embodiment 19. The communications system of system embodiment 18, wherein the cluster of SBCs includes N SBCs, N being a positive integer; wherein N−1 SBCs in the cluster of SBCs being in an active mode of operation for processing SIP messages and one SBC being in a standby mode of operation for processing SIP message; and wherein no key value type threshold value is greater than N−1.

System Embodiment 20. The communications system of system embodiment 19 further comprising: a load balancer that distributes incoming SIP messages to be processed by the cluster of SBCs among the SBCs of the cluster which are in an active mode of operation.

System Embodiment 21. The communications system of system embodiment 12, wherein said first SBC determines to drop said first message based on one or more extracted key values to prevent a possible message processing fault occurring at the first SBC during processing of the first message.

LIST OF EXEMPLARY NUMBERED NON-TRANSITORY MACHINE READABLE MEDIUM EMBODIMENTS

Non-transitory Machine Readable Medium Embodiment 1. A non-transitory machine readable medium including processor executable instructions, which when executed by a processor of a first session border controller control the first session border controller to: enable message blocking at the first Session Border Controller (SBC) for Session Initiation Protocol (SIP) messages including a first key value in response to a first threshold number of SIP messages including the first key value having caused a SIP message processing failure (e.g. at an SBC where the SIP processing failure may be at any one of a plurality of SBCs in a cluster of SBCs which includes said first SBC); receive, at the first Session Border Controller, a first Session Initiation Protocol (SIP) message including at least one key value; determine, at the first SBC, if message blocking is enabled for one or more key values included in the first SIP message; and perform, at the first SBC, one of: i) dropping the first SIP message in response to determining that message blocking is enabled for one or more key values included in the first SIP message; and ii) processing the first SIP message in response to determining that message blocking is not enabled for a key value included in the first SIP message.

Non-transitory Machine Readable Medium Embodiment 2. The non-transitory machine readable medium of Non-transitory Machine Readable Medium Embodiment 1, wherein said key values included in the first SIP message include at least one of a call-id value, a calling party value (e.g., calling party identifier such as a telephone number, name or address), a called party value (e.g., called party identifier such as a telephone number, name or address), a called party value and a calling party value, and a peer device Internet Protocol address value.

Non-transitory Machine Readable Medium Embodiment 2A. The non-transitory machine readable medium of Non-transitory Machine Readable Medium Embodiment 2, wherein the first SIP message is a SIP INVITE request message for a Voice Over Internet Protocol (VOIP) call.

Non-transitory Machine Readable Medium Embodiment 3. The non-transitory machine readable medium of Non-transitory Machine Readable Medium Embodiment 2, wherein said instructions when executed by said processor further control the first SBC to perform the following additional operations: receive, at the first SBC, from a second SBC, a message indicating key values in a second SIP message that caused a SIP message processing failure at the second SBC; and update a count of key values stored at the first SBC for each of the indicated key values in the second SIP message.

Non-transitory Machine Readable Medium Embodiment 4. The non-transitory machine readable medium of Non-transitory Machine Readable Medium Embodiment 3, wherein said instructions when executed by said processor further control the first SBC to perform the following additional operations: store in the first SBC, a SIP message blocking threshold number for each of a plurality of different key values.

Non-transitory Machine Readable Medium Embodiment 5. The non-transitory machine readable medium of Non-transitory Machine Readable Medium Embodiment 4 wherein said instructions when executed by said processor further control the first SBC to perform the following additional operations: set a first threshold value for a first key value type; set a second threshold value for a second key value type; and wherein said store in the first SBC, a SIP message blocking threshold number for each of a plurality of different key values, includes storing the first threshold value as the SIP message blocking threshold number for each key value being of the first key value type and storing said second threshold value for each key value being of the second key value type.

Non-transitory Machine Readable Medium Embodiment 6. The non-transitory machine readable medium of Non-transitory Machine Readable Medium Embodiment 5, wherein said instructions when executed by said processor further control the first SBC to perform the following additional operations: set a lower SIP message blocking threshold value for a first key value type than a second key value type; wherein each key value corresponds to a key value type; and wherein said first key value type blocks fewer SIP messages than said second key value type.

Non-transitory Machine Readable Medium Embodiment 6A. The non-transitory machine readable medium of Non-transitory Machine Readable Medium Embodiment 6, wherein said first key value type is a call-id key value type and said second key value type is a calling party key value type.

Non-transitory Machine Readable Medium Embodiment 7. The non-transitory machine readable medium of Non-transitory Machine Readable Medium Embodiment 3 further including processor executable instructions, which when executed by a processor of a second session border controller control the second session border controller to perform the following operations: receive the second SIP message; identify key values in the second SIP message; detect at the second SBC a SIP message processing failure caused by the processing of said second SIP message (e.g., a catastrophic SIP message processing failure); and communicate to other SBCs key values included in said second SIP message along with an indication that the communicated key values were associated with a SIP message processing failure.

Non-transitory Machine Readable Medium Embodiment 8. The non-transitory machine readable medium of Non-transitory Machine Readable Medium Embodiment 3, wherein said first and second SBCs are part of a plurality of SBCs forming a cluster of SBCs, each of said SBCs in said cluster of SBCs upon the detection of a SIP message processing failure (e.g., a catastrophic SIP message processing failure) communicating key values extracted from the SIP message being processed by the SBC at the time of the SIP processing failure to the other SBCs of the cluster of SBCs.

Non-transitory Machine Readable Medium Embodiment 9. The non-transitory machine readable medium of Non-transitory Machine Readable Medium Embodiment 8 wherein each of SBCs in the cluster of SBC includes a processor that controls the SBC in which the processor is included to track SIP message processing failures by key value, said tracking SIP processing message failures by key value including updating by each SBC of the cluster a key value count for each key value included in a SIP message that caused or was being processed during a SIP processing message failure at any one of the SBCs in the cluster of SBCs during a first time period.

Non-transitory Machine Readable Medium Embodiment 10. The non-transitory machine readable medium of Non-transitory Machine Readable Medium Embodiment 9, wherein said tracking includes storing by each SBC the updated key value counts with the corresponding key value in a record within the memory of the SBC.

Non-transitory Machine Readable Medium Embodiment 10A. The non-transitory machine readable medium of Non-transitory Machine Readable Medium Embodiment 10, wherein said first period of time is a sliding time window.

Non-transitory Machine Readable Medium Embodiment 10B. The non-transitory machine readable medium of Non-transitory Machine Readable Medium Embodiment 10A wherein said tracking further includes updating the key value counts to exclude key values from messages that caused a SIP processing message failure not within said sliding time window based on a time stamp corresponding to the message from which the key value was included.

Non-transitory Machine Readable Medium Embodiment 11. The non-transitory machine readable medium of Non-transitory Machine Readable Medium Embodiment 10, wherein each of said processors included in each of said SBCs controls the SBC in which the processor is included to store key value counts for call-id values, calling party values (e.g., calling party identifiers such as telephone numbers, names or addresses), called party values (e.g., called party identifiers such as telephone numbers, names or addresses), called party and calling party values, and peer device Internet Protocol address values.

Non-transitory Machine Readable Medium Embodiment 12. A non-transitory machine readable medium including processor executable instructions, which when executed by a processor of a first session border controller control the first session border controller to: receive, by a first Session Border Controller (SBC), a first message including a plurality of message headers; perform, by the first SBC, a message processing failure verification check on the first message to determine whether to process said first message or drop said first message, the message processing failure verification check including: extracting, by the first SBC, one or more key values from one or more of the plurality of message headers; and determining, by the first SBC, based on the one or more key values whether to process said first message or to drop said first message based on said one or more extracted key values.

Non-transitory Machine Readable Medium Embodiment 13. The non-transitory machine readable medium of Non-transitory Machine Readable Medium Embodiment 12, wherein said first SBC is one of plurality of SBCs included in a cluster of SBCs; and wherein said first message includes a Session Initiation Protocol request.

Non-transitory Machine Readable Medium Embodiment 14. The non-transitory machine readable medium of Non-transitory Machine Readable Medium Embodiment 13, wherein said first SBC is further controlled to store at the first SBC a key value count for each key value extracted from a message being processed by one of the SBCs of the cluster of SBCs when said SBC experienced a message processing failure; and wherein said determining, by the first SBC, based on the one or more key values whether to process said first message or to drop said first message based on said one or more extracted key values from said first message includes comparing said one or more key values extracted from said first message to a key value drop list generated by the first SBC based on key values identified by SBCs of the cluster of SBCs as being extracted from messages being processed at a time when the SBC processing the message experienced a message processing failure.

Non-transitory Machine Readable Medium Embodiment 14A. The non-transitory machine readable medium of Non-transitory Machine Readable Medium Embodiment 12, wherein the first SBC is further controlled to store at the first SBC in persistent memory a key value count for each key value extracted from a message being processed by the first SBC when the first SBC experiences a message processing failure; and wherein said determining, by the first SBC, whether to process said first message or to drop said first message based on said one or more extracted key values from said first message includes comparing said one or more key values extracted from said first message to a key value drop list generated by the first SBC based on key values identified by the first SBC as being extracted from messages being processed at a time when the first SBC experienced a message processing failure.

Non-transitory Machine Readable Medium Embodiment 14B. The non-transitory machine readable medium of Non-transitory Machine Readable Medium Embodiment 14A, wherein the key value drop list is also stored in the persistent memory.

Non-transitory Machine Readable Medium Embodiment 15. The non-transitory machine readable medium of Non-transitory Machine Readable Medium Embodiment 14, wherein said message processing failure is a software failure in which the SBC which experiences the message processing failure requires rebooting of the SBC.

Non-transitory Machine Readable Medium Embodiment 15A. The non-transitory machine readable medium of Non-transitory Machine Readable Medium Embodiment 14, wherein said message processing failure is a software failure which causes the SBC which experiences the message processing failure to crash and cease to provide message processing services.

Non-transitory Machine Readable Medium Embodiment 16. The non-transitory machine readable medium of Non-transitory Machine Readable Medium Embodiment 14, wherein said instructions further control the first SBC to: set a key value type threshold value for each key value type, each key value corresponding to a key value type; and generate the key value drop list by including on the key value drop list key values which have a key value count greater than the key value type threshold to which the key value corresponds.

Non-transitory Machine Readable Medium Embodiment 17. The non-transitory machine readable medium of Non-transitory Machine Readable Medium Embodiment 16, wherein said instructions further control the first SBC to receive key values from other SBCs in the cluster of SBCs and an indication that said key values were extracted from a message which was being processed at the time the SBC detected or experienced a message processing fault.

Non-transitory Machine Readable Medium Embodiment 18. The non-transitory machine readable medium of Non-transitory Machine Readable Medium Embodiment 17, wherein said key values, said key value counts, and key value type threshold values are stored at the first SBC in persistent memory.

Non-transitory Machine Readable Medium Embodiment 19. The non-transitory machine readable medium of Non-transitory Machine Readable Medium Embodiment 18, wherein the cluster of SBCs includes N SBCs, N being a positive integer; wherein N−1 SBCs in the cluster of SBCs being in an active mode of operation for processing SIP messages and one SBC being in a standby mode of operation for processing SIP message; and wherein no key value type threshold value is greater than N−1.

Non-transitory Machine Readable Medium Embodiment 20. The non-transitory machine readable medium of Non-transitory Machine Readable Medium Embodiment 12, wherein said first SBC determines to drop said first message based on one or more extracted key values to prevent a possible message processing fault occurring at the first SBC during processing of the first message.

The techniques of various embodiments may be implemented using software, hardware and/or a combination of software and hardware. Various embodiments are directed to apparatus, e.g., sensors, call processing devices, gateways, session border controllers, network nodes and/or network equipment devices. Various embodiments are also directed to methods, e.g., method of controlling and/or operating devices such as sensors, call processing devices, gateways, session border controllers, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border controllers, network nodes and/or network equipment devices, including a processor configured to implement one, multiple or all of the steps of one or more methods of the invention.

In some embodiments, the processor or processors, e.g., CPUs, of one or more devices, e.g., computing nodes such as call processing devices, session border controllers are configured to perform the steps of the methods described as being performed by the computing nodes, e.g., sensors, call processing devices, gateways, session border controllers, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as sensors, call processing devices, gateways, session border controllers, network nodes and/or network equipment devices with a processor which includes a component corresponding to each of the steps of the various described methods performed by the device in which the processor is included. In some but not all embodiments a device, e.g., computing node such as session border controllers, gateways, message and/or packet processing devices, call processing devices, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope of the invention. Numerous additional embodiments, within the scope of the present invention, will be apparent to those of ordinary skill in the art in view of the above description and the claims which follow. Such variations are to be considered within the scope of the invention.

What is claimed is:

1. A communications method, comprising:
   enabling message blocking at a first Session Border Controller (SBC) for Session Initiation Protocol (SIP) messages including a first key value in response to a first threshold number of SIP messages including the first key value having caused a SIP message processing failure;
   receiving, at the first SBC, a first SIP message including at least one key value;
   determining, at the first SBC, if message blocking is enabled for one or more key values included in the first SIP message; and
   performing, at the first SBC, one of:
      i) dropping the first SIP message in response to determining that message blocking is enabled for one or more key values included in the first SIP message; and
      ii) processing the first SIP message in response to determining that message blocking is not enabled for a key value included in the first SIP message.

2. The method of claim 1, wherein said SIP message processing failure is a software failure which causes the entity which experiences the SIP message processing failure to crash and cease to provide SIP message processing services until a reboot of the entity.

3. The method of claim 2, further comprising:
   maintaining in persistent memory at the first SBC a first key value count, said first key value count indicating the number of times the first key value was included in a SIP message which caused an entity processing the SIP message to experience a SIP message processing failure; and
   updating, by the first SBC, the first key value count maintained in persistent memory at the first SBC whenever the first SBC experiences a SIP message processing failure at the first SBC while processing a received SIP message including the first key value.

4. The method of claim 2, wherein said at least one key value included in the first SIP message includes at least one of: (i) a call-id value, (ii) a calling party value, (iii) a called party value, (iv) a called party value and a calling party value, and (v) a peer device Internet Protocol address value.

5. The method of claim 3, further comprising:
   receiving, at the first SBC, from a second SBC, a message indicating one or more key values in a second SIP message that caused a SIP message processing failure at the second SBC, said one or more key values in the second SIP message that caused a SIP message processing failure at the second SBC including at least the first key value; and
   updating, by the first SBC, a key value count maintained in persistent memory at the first SBC for each of the one or more indicated key values in the second SIP message; and
   wherein said updating a key value count maintained at the first SBC for each of the one or more indicated key values in the second SIP message includes updating, by the first SBC, the first key value count maintained in persistent memory at the first SBC.

6. The method of claim 5, further comprising:
   after each update of the first key value count by the first SBC, determining by the first SBC whether or not to enable message blocking at the first SBC for received SIP messages including the first key value based on: (i) the updated first key value count, and (ii) a first SIP message blocking threshold number for the first key value.

7. The method of claim 1, further comprising:
   wherein said determining, at the first SBC, if message blocking is enabled for one or more key values included in the first SIP message includes:
      determining if a key value included in the first SIP message matches the first key value; and upon determining that a key value included in the first SIP message matches the first key value, determining that message blocking is enabled for one or more key values included in the first SIP message.

8. The method of claim 5, further comprising:
operating the second SBC to receive the second SIP message;
identifying key values in the second SIP message;
detecting, at the second SBC, a SIP message processing failure caused by the processing of said second SIP message; and
communicating to other SBCs key values included in said second SIP message along with an indication that the communicated key values were associated with a SIP message processing failure.

9. The method of claim 8,
wherein said first and second SBCs are part of a plurality of SBCs forming a cluster of SBCs, each of said SBCs in said cluster of SBCs, upon the detection of a SIP message processing failure, communicates key values extracted from the SIP message being processed by the SBC at the time of the SIP message processing failure to the other SBCs of the cluster of SBCs.

10. The method of claim 9, wherein each SBC of the cluster of SBCs maintains in its persistent memory key value counts for call-id values, calling party values, called party values, called party and calling party values, and peer device Internet Protocol address values.

11. A communications system comprising:
a first Session Border Controller (SBC) including: (i) persistent memory and (ii) a first processor, said first processor controlling the first SBC to perform the following operations:
enabling message blocking at the first SBC for Session Initiation Protocol (SIP) messages including a first key value in response to a first threshold number of SIP messages including the first key value having caused a SIP message processing failure;
receiving, at the first SBC, a first SIP message including at least one key value;
determining, at the first SBC, if message blocking is enabled for one or more key values included in the first SIP message; and
performing, at the first SBC, one of:
i) dropping the first SIP message in response to determining that message blocking is enabled for one or more key values included in the first SIP message; and
ii) processing the first SIP message in response to determining that message blocking is not enabled for a key value included in the first SIP message.

12. The communications system of claim 11, wherein said SIP message processing failure is a software failure which causes the entity which experiences the SIP message processing failure to crash and cease to provide SIP message processing services until a reboot of the entity.

13. The communications system of claim 12, wherein said first processor further controls the first SBC to the perform the additional operations of:
maintaining in said persistent memory at the first SBC a first key value count, said first key value count indicating the number of times the first key value was included in a SIP message which caused an entity processing the SIP message to experience a SIP message processing failure; and
updating, by the first SBC, the first key value count maintained in said persistent memory at the first SBC whenever the first SBC experiences a SIP message processing failure at the first SBC while processing a received SIP message including the first key value.

14. The communications system of claim 12, wherein said at least one key value included in the first SIP message includes at least one of: (i) a call-id value, (ii) a calling party value, (iii) a called party value, (iv) a called party value and a calling party value, and (v) a peer device Internet Protocol address value.

15. The communications system of claim 13, wherein the first processor further controls the first SBC to perform the additional operations of:
receiving, at the first SBC, from a second SBC, a message indicating one or more key values in a second SIP message that caused a SIP message processing failure at the second SBC, said one or more key values in the second SIP message that caused a SIP message processing failure at the second SBC including at least the first key value; and
updating, by the first SBC, a key value count maintained in said persistent memory at the first SBC for each of the one or more indicated key values in the second SIP message; and
wherein said updating a key value count maintained at the first SBC for each of the one or more indicated key values in the second SIP message includes updating, by the first SBC, the first key value count maintained in said persistent memory at the first SBC.

16. The communications system of claim 15, wherein the first processor after each update of the first key value count by the first SBC further controls the first SBC to perform the additional operation of:
determining, by the first SBC, whether or not to enable message blocking at the first SBC for received SIP messages including the first key value based on: (i) the updated first key value count, and (ii) a first SIP message blocking threshold number for the first key value.

17. The communications system of claim 11, further comprising:
wherein said determining, at the first SBC, if message blocking is enabled for one or more key values included in the first SIP message includes:
determining if a key value included in the first SIP message matches the first key value; and
upon determining that a key value included in the first SIP message matches the first key value, determining that message blocking is enabled for one or more key values included in the first SIP message.

18. The communications system of claim 15,
wherein said second SBC includes a second processor that controls the second SBC to perform the following operations:
operating the second SBC to receive the second SIP message;
identifying key values in the second SIP message;
detecting, at the second SBC, a SIP message processing failure caused by the processing of said second SIP message; and
communicating to other SBCs key values included in said second SIP message along with an indication that the communicated key values were associated with a SIP message processing failure.

19. The communications system of claim 18,
wherein said first and second SBCs are part of a plurality of SBCs forming a cluster of SBCs, each of said SBCs in said cluster of SBCs, upon the detection of a SIP message processing failure, communicates key values extracted from the SIP message being processed by the SBC at the time of the SIP message processing failure to the other SBCs of the cluster of SBCs.

20. A non-transitory machine readable medium including processor executable instructions, which when executed by a processor of a first session border controller (SBC), control the first SBC to:

enable message blocking at the first SBC for Session Initiation Protocol (SIP) messages including a first key value in response to a first threshold number of SIP messages including the first key value having caused a SIP message processing failure;

receive, at the first SBC, a first SIP message including at least one key value;

determine, at the first SBC, if message blocking is enabled for one or more key values included in the first SIP message; and perform, at the first SBC, one of:
  i) dropping the first SIP message in response to determining that message blocking is enabled for one or more key values included in the first SIP message; and
  ii) processing the first SIP message in response to determining that message blocking is not enabled for a key value included in the first SIP message.

* * * * *